United States Patent
Kim et al.

(10) Patent No.: US 10,749,367 B2
(45) Date of Patent: Aug. 18, 2020

(54) CHARGING APPARATUS AND METHOD FOR CONTROLLING WIRELESS CHARGING

(71) Applicant: Samsung Electronics Co., Ltd., Suwon-si, Gyeonggi-do (KR)

(72) Inventors: Dong-Zo Kim, Yongin-si (KR); Do-Won Kim, Suwon-si (KR); Jae-Hyun Park, Yongin-si (KR); Sung-Ku Yeo, Suwon-si (KR); Sung-Bum Park, Suwon-si (KR); Young-Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/468,442

(22) Filed: Mar. 24, 2017

(65) Prior Publication Data

US 2017/0302097 A1  Oct. 19, 2017

(30) Foreign Application Priority Data

Apr. 15, 2016  (KR) .................. 10-2016-0046215

(51) Int. Cl.
*H02J 7/02* (2016.01)
*H02J 50/23* (2016.01)
(Continued)

(52) U.S. Cl.
CPC .......... *H02J 7/025* (2013.01); *H02J 7/00036* (2020.01); *H04B 5/0037* (2013.01); *H04B 5/0081* (2013.01); *H01F 38/14* (2013.01); *H02J 50/00* (2016.02); *H02J 50/10* (2016.02); *H02J 50/12* (2016.02); *H02J 50/15* (2016.02); *H02J 50/20* (2016.02); *H02J 50/23* (2016.02);
(Continued)

(58) Field of Classification Search
CPC .. H02J 7/025; H02J 50/12; H02J 50/10; H02J 50/80; H02J 50/40; H01F 38/14
USPC .......................................... 320/108
See application file for complete search history.

(56) References Cited

U.S. PATENT DOCUMENTS 8,482,159 B2 * 7/2013 Shimokawa ............. H01Q 7/00
  307/104
8,830,036 B2 * 9/2014 Park ...................... H02J 7/0052
  340/10.34
(Continued)

FOREIGN PATENT DOCUMENTS

EP   2 747 299 A2   6/2014
WO   WO 2015064815 A1 *  5/2015 ............. H02J 50/40
WO   WO-2016182208 A1 * 11/2016 ............. H02J 50/12

OTHER PUBLICATIONS

International Search Report dated Jul. 11, 2017, issued in the International Application No. PCT/KR2017/004062 dated Apr. 14, 2017.
(Continued)

*Primary Examiner* — David V Henze-Gongola
*Assistant Examiner* — Tarikh Kanem Rankine
(74) *Attorney, Agent, or Firm* — Jefferson IP Law, LLP

(57) ABSTRACT

A method of a charging apparatus for controlling wireless charging is provided. The method includes detecting an electronic device, determining a charging method corresponding to the detected electronic device, and wirelessly charging the electronic device by selecting a coil corresponding to the determined charging method.

13 Claims, 10 Drawing Sheets

(51) Int. Cl.
*H02J 50/00* (2016.01)
*H02J 50/12* (2016.01)
*H02J 50/20* (2016.01)
*H02J 50/80* (2016.01)
*H02J 50/60* (2016.01)
*H02J 50/90* (2016.01)
*H02J 50/10* (2016.01)
*H02J 50/15* (2016.01)
*H02J 50/27* (2016.01)
*H02J 50/70* (2016.01)
*H04B 5/00* (2006.01)
*H02J 7/00* (2006.01)
*H01F 38/14* (2006.01)
*H02J 50/40* (2016.01)

(52) U.S. Cl.
CPC ............ *H02J 50/27* (2016.02); *H02J 50/402* (2020.01); *H02J 50/60* (2016.02); *H02J 50/70* (2016.02); *H02J 50/80* (2016.02); *H02J 50/90* (2016.02)

(56) References Cited

U.S. PATENT DOCUMENTS

| | | | | |
|---|---|---|---|---|
| 9,176,551 B2* | 11/2015 | Min | ...................... | H02J 7/0052 |
| 9,231,428 B2* | 1/2016 | Yoon | ...................... | H02J 5/005 |
| 9,584,189 B2* | 2/2017 | Kurs | ...................... | H01Q 1/248 |
| 9,793,761 B2* | 10/2017 | Sampei | ...................... | H02J 50/10 |
| 2008/0054638 A1* | 3/2008 | Greene | ................... | H02J 50/40 |
| | | | | 290/1 R |
| 2011/0115433 A1 | 5/2011 | Lee et al. | | |
| 2013/0076306 A1* | 3/2013 | Lee | ......................... | H02J 7/025 |
| | | | | 320/108 |
| 2013/0214612 A1* | 8/2013 | Bae | ......................... | H02J 7/025 |
| | | | | 307/104 |
| 2013/0335020 A1 | 12/2013 | Moore | | |
| 2014/0159502 A1* | 6/2014 | Shimokawa | ............ | H02J 50/50 |
| | | | | 307/104 |
| 2014/0176082 A1* | 6/2014 | Visser | ................... | H01Q 1/248 |
| | | | | 320/137 |
| 2015/0115878 A1 | 4/2015 | Park | | |
| 2015/0137746 A1* | 5/2015 | Lee | ......................... | H02J 7/025 |
| | | | | 320/108 |
| 2015/0233987 A1 | 8/2015 | Von Novak, III et al. | | |
| 2016/0094048 A1* | 3/2016 | Bae | ......................... | H02J 50/12 |
| | | | | 307/104 |
| 2016/0204643 A1 | 7/2016 | Manova-Elssibony | ..................... | |
| | | | | H04B 5/0037 |
| | | | | 320/108 |
| 2016/0254705 A1* | 9/2016 | Jung | ...................... | H02J 50/40 |
| | | | | 307/104 |
| 2016/0380467 A1* | 12/2016 | Shao | ....................... | H02J 7/025 |
| | | | | 320/108 |
| 2017/0353055 A1* | 12/2017 | Han | ......................... | H02J 50/12 |
| 2018/0138749 A1* | 5/2018 | Lee | ......................... | H02J 7/025 |
| 2018/0205268 A1* | 7/2018 | Park | ........................ | H02J 50/12 |

OTHER PUBLICATIONS

European Application dated Nov. 2, 2018; European Appln. No. 17782697.1-1202.

* cited by examiner

CHARGING APPARATUS AND METHOD FOR CONTROLLING WIRELESS CHARGING

CROSS REFERENCE TO RELATED APPLICATION(S)

This application claims the benefit under 35 U.S.C. § 119(a) of a Korean patent application filed on Apr. 15, 2016 in the Korean Intellectual Property Office and assigned Serial number 10-2016-0046215, the entire disclosure of which is hereby incorporated by reference.

TECHNICAL FIELD

The present disclosure relates to a charging apparatus. More particularly, the present disclosure relates to a charging apparatus and a method for controlling the wireless charging of an electronic device.

BACKGROUND

Services and additional functions, which are provided by electronic devices, have been gradually extended and diversified. Electronic devices have been continuously developed in order to improve the effective value of the electronic device and in order to meet various desires of users. As an example of satisfying the user's desire, the electronic device may be wirelessly supplied with power from a charging apparatus that supplies power, and the charging apparatus may wirelessly supply power to the electronic device.

In general, a method for providing wireless charging to the electronic device includes a magnetic induction method and a magnetic resonance method. The magnetic induction method may be effectively performed in a short range, which uses an induction phenomenon between coils and uses a frequency of several KHz, and its transmission distance is normally within several centimeters. In such a magnetic induction method, when the charging apparatus and the electronic device are spaced 1 mm apart from each other, the efficiency of charging may be 90% of that of a wired charging method. With regard to the magnetic induction method, when a variable current is applied to a transmission coil, an induction current is generated in a reception coil with the same frequency by the non-radiation type of electromagnetic wave that is generated to have the same frequency as the applied variable current, thereby charging the electronic device.

In addition, the magnetic resonance method uses a resonance phenomenon between the transmission coil and the reception coil by using resonance coils, which uses a frequency of 1 to 20 MHz, and its transmission distance is normally within several meters. For example, the magnetic resonance method may use a frequency of 6.78 MHz. In such a magnetic resonance method, when the charging apparatus and the electronic device are spaced several centimeters apart from each other, the efficiency of charging may be 70% of that of a wired charging method. With regard to the magnetic resonance method, the magnetic field generated by a variable current applied from the transmission coil is applied to the resonance coil by means of an inductive coupling, and a magnetic resonance coupling occurs between the resonance coils having the same resonance frequency, and thus the induction coupling is generated in the reception coil, thereby charging the electronic device.

The above information is presented as background information only to assist with an understanding of the present disclosure. No determination has been made, and no assertion is made, as to whether any of the above might be applicable as prior art with regard to the present disclosure.

SUMMARY

Typically, charging apparatuses using the magnetic induction method have been sold in the market. Recently, charging apparatuses using the magnetic resonance method have been introduced.

However, the charging apparatuses of the related art are designed to charge the electronic device by using one of the magnetic induction method or the magnetic resonance method, and charge the electronic device by only one method. Therefore, since the charging apparatus charges the electronic device by only one method, the user who uses an electronic device that is charged by using the other method should buy a separate charging apparatus according to the charging method of his/her own electronic device.

Accordingly, it is necessary to provide the magnetic induction charging and the magnetic resonance charging together with a single charging apparatus.

Aspects of the present disclosure are to address at least the above-mentioned problems and/or disadvantages and to provide at least the advantages described below. Accordingly, an aspect of the present disclosure is to provide a charging apparatus and a method for controlling wireless charging of one or more electronic devices.

Another aspect of the present disclosure is to provide a multi-mode charging apparatus and a method for supporting both the magnetic induction method and the magnetic resonance method.

In accordance with an aspect of the present disclosure, a method of a charging apparatus for controlling wireless charging is provided. The method includes detecting an electronic device, determining a charging method corresponding to the detected electronic device, and wirelessly charging the electronic device by selecting a coil corresponding to the determined charging method.

In accordance with another aspect of the present disclosure, a charging apparatus for controlling wireless charging is provided. The charging apparatus includes a power transmitter configured to adopt a plurality of coils for wirelessly charging an electronic device, and a controller configured to detect the electronic device, determine a charging method corresponding to the detected electronic device, and control the wireless charging of the electronic device by selecting a coil from among the plurality of coils corresponding to the determined charging method.

The present disclosure provides both the magnetic induction charging method and the magnetic resonance charging method by a single charging apparatus so that wireless charging can be freely conducted regardless of the charging method.

In addition, the charging method corresponding to each of a plurality of electronic devices may be determined and the electronic devices may be simultaneously charged according to the determined charging method, respectively, so that a plurality of electronic devices of the same charging method can be charged at the same time and so that a plurality of electronic devices of different charging methods can also be charged at the same time.

In addition, since the present disclosure provides a multi-charging method, the manufacturer can produce the charging apparatus without limitations on the charging method and without additional costs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
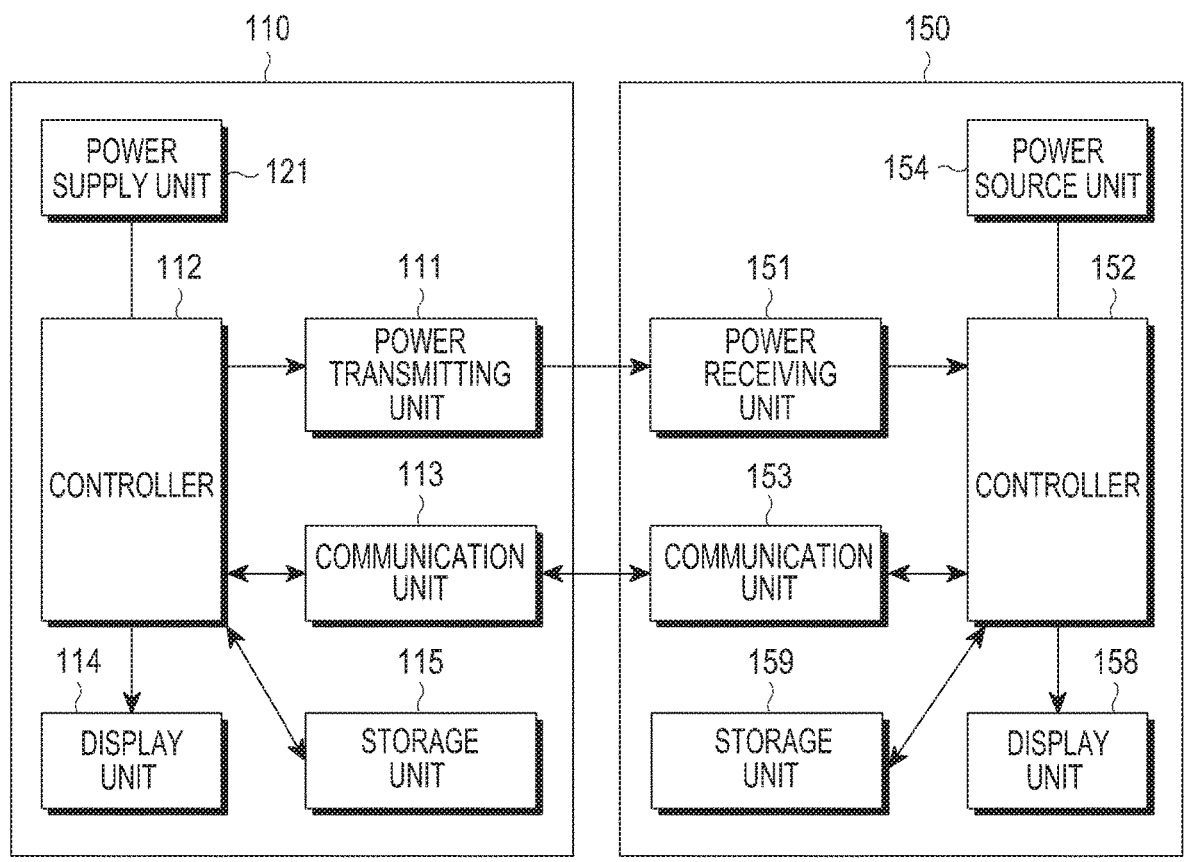
FIG. 1A is a block diagram showing an electronic device and a charging apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/ to or connected to" another element (e.g., a second element), it should be construed that the one element is directly connected to the other element or the one element is indirectly connected to the other element via yet another element (e.g., a third element). In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The smart home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, a charging device and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or interne device of things (e.g., a light bulb, various sensors, electric or gas meter, a sprinkler device, a fire alarm, a thermostat, a streetlamp, a toaster, a sporting goods, a hot water tank, a heater, a boiler, etc.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1A is a block diagram showing an electronic device and a charging apparatus according to an embodiment of the present disclosure.

Referring to FIG. 1A, the charging apparatus 110 may include a power transmitting unit 111, a controller 112, a communication unit 113, a display unit 114, a storage unit 115, and a power supply unit 121. The charging apparatus 110, according to various embodiments of the present disclosure, may provide power to one or more electronic devices that adopt, for example, a battery or a power source, and may be referred to as a charger. The power transmitting unit 111 may include one or more induction coils and one or more resonance coils.

According to various embodiments, the power transmitting unit 111 may provide power required by the electronic device 150, and may wirelessly provide power to the electronic device 150. Here, the power transmitting unit 111 may provide power in the form of an alternating current (AC), and may convert a direct current (DC) power into an AC power by using an inverter to then supply the AC power to the electronic device 150. It may be obvious to those skilled in the art that any means for providing the AC power can be adopted as the power transmitting unit 111.

According to various embodiments, the communication unit 113 may communicate with the electronic device 150 by means of a predetermined method. The communication unit 113 can receive power information from the electronic device 150. Here, the power information may include at least one piece of output voltage information or charging current information of the electronic device 150. Alternatively, the power information may contain information about the insertion of a wired charging terminal, conversion from the stand-alone (SA) mode to the non-stand-alone (NSA) mode, or release of an error situation. The charging apparatus 110 may adjust the power supplied to the electronic device 150 through the received power information.

In addition, the communication unit 113 may transmit a charging function control signal for controlling a charging function of the electronic device 150. The communication unit 113 may communicate with the electronic device 150 through a frequency (out-of-band) that is different from the frequency of a wireless power signal. The charging function control signal may be a control signal that controls a power receiving unit 151 of a specific electronic device 150 to enable, or disable, the charging function. In addition, the charging function control signal may be information that is related to the determination of a cross connection, according to various embodiments of the present disclosure. For example, the charging function control signal may contain identification information or configuration information for determining the cross connection, and may contain a pattern or time information, which are related to a change in the load of the electronic device 150 for determining the cross connection. The communication unit 113 may receive signals from another charging apparatus (not shown), as well as from the electronic device 150.

According to various embodiments, the power supply unit 121 may receive an AC power (e.g., 220V) from the outside, and may convert the received AC power to a DC power. Typically, the power supply unit 121 may be supplied with power from the outside by inserting a terminal (e.g., an adapter) into the outlet on the wall. For example, the power supply unit 121 may convert an AC power of 220V, which is received from the outside, into a DC power of 5V or 9V. The power supply unit 121 may include a variable DC/DC device that is able to boost the converted DC power of 5V or 9V to 10V~20V.

According to various embodiments, the controller 112 may control overall operations of the charging apparatus 110. The controller 112 may control overall operations of the charging apparatus 110 by using algorithms, programs, or applications, which are read from the storage unit 115. The controller 112 may be implemented in the form of a CPU, a microprocessor, or a mini-computer. The controller 112, for example, may perform a calculation or data processing related to the control or communication of one or more other elements of the charging apparatus 110, and/or may execute, or control, a wireless charging transmission/reception mode through the coils. The controller 112 may control a power transmission mode for supplying power to the electronic device 150, and may select a coil corresponding to the electronic device from a plurality of coils.

According to various embodiments, the controller 112 may display the state of the electronic device 150 on the display unit 114 based on the signal received from the electronic device 150 through the communication unit 113. In addition, the controller 112 may display, on the display unit 114, the estimated time to complete the charging of the electronic device 150.

In addition, as shown in FIG. 1A, the electronic device 150 may include a power receiving unit 151, a controller 152, a communication unit 153, a power source unit 154, a display unit 158, and a storage unit 159.

According to various embodiments, the power receiving unit 151 may wirelessly receive power transmitted from the charging apparatus 110. Here, the power receiving unit 151 may receive power in the form of an AC waveform. The received power may charge the power source unit 154 under the control of the controller 152.

According to various embodiments, the controller 152 may control the overall operations of the electronic device 150. The controller 152 may control the overall operations of the electronic device 150 by using algorithms, programs, or applications, which are read from the storage unit 159 and are required for the control. The controller 152 may be implemented in the form of a CPU, a microprocessor, or a minicomputer.

According to various embodiments, the communication unit 153 may communicate with the charging apparatus 110 by a predetermined method. When a power beacon is received from the charging apparatus 110, the communication unit 153 may transmit power information to the charging apparatus 110. Here, the power information may include at least one piece of the output voltage information or the charging current information of the electronic device 150.

In addition, the communication unit 153 may transmit a charging function control signal for controlling the charging function of the electronic device 150. Alternatively, as will be described in more detail later, the power information may contain information, such as the insertion of a wired charging terminal, conversion from the SA mode to the NSA mode, or release of an error situation. In addition, the charging function control signal may be information that is related to the determination of the cross connection, according to various embodiments of the present disclosure. For example, the charging function control signal may contain identification information and configuration information for the determination of the cross connection, and may contain a pattern or time information in relation to a load change of the electronic device 150 for the determination of the cross connection.

According to various embodiments, the controller 152 may make a control to display the state of the electronic device 150 on the display unit 158. In addition, the controller 152 may display the estimated time to complete the charging of the electronic device 150 on the display unit 158.

Figure 1B:
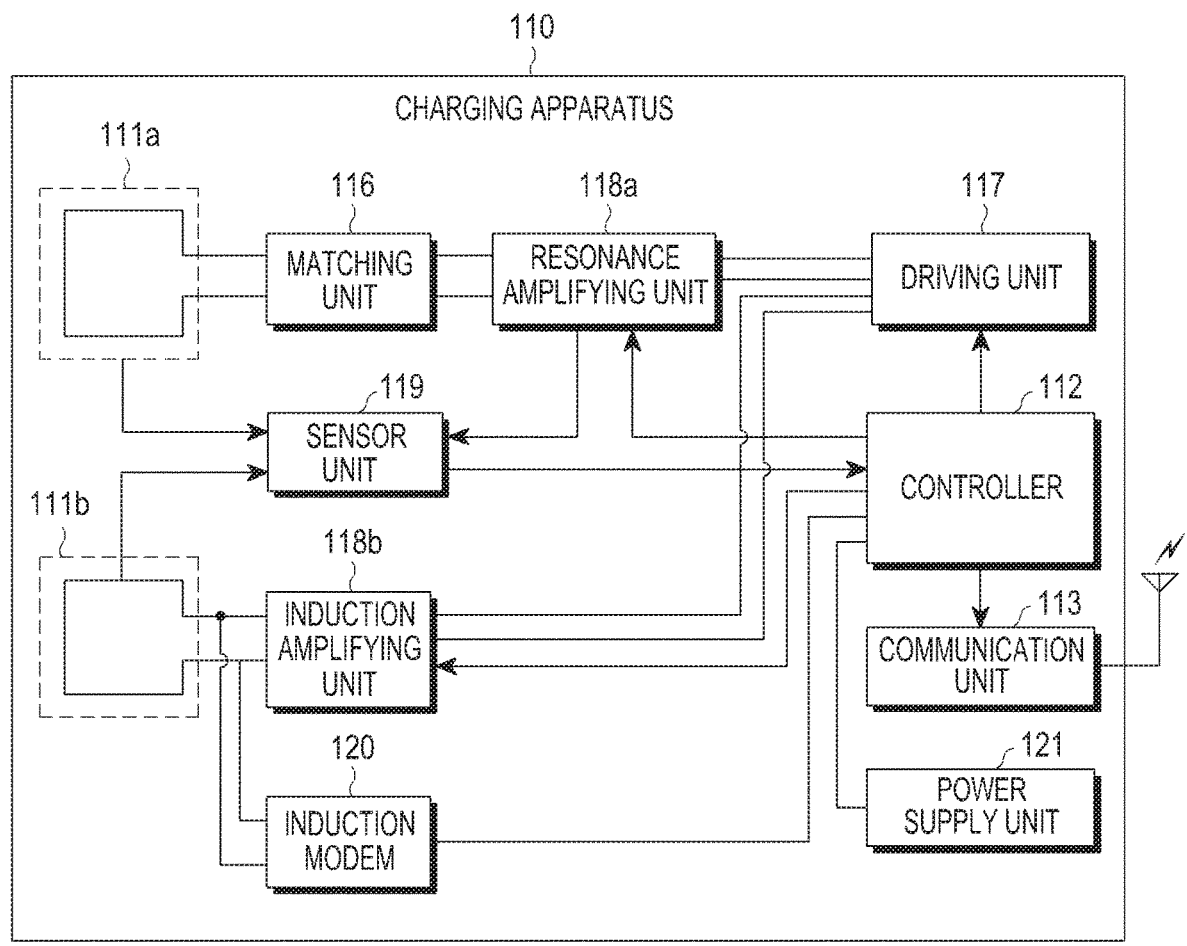
FIG. 1B is a detailed block diagram of a charging apparatus according to an embodiment of the present disclosure.

FIG. 1B is a detailed block diagram of a charging apparatus according to an embodiment of the present disclosure.

Referring to FIG. 1B, the charging apparatus 110 may include a resonance coil unit 111a, an induction coil unit 111b, a controller 112 (e.g., a processor), a communication unit 113, a driving unit 117, a resonance amplifying unit 118a, an induction amplifying unit 118b, a matching unit 116, an induction modem 120, a sensor unit 119, and a power supply unit 121.

According to various embodiments, the resonance coil unit 111a and the induction coil unit 111b may be configured in a power transmitting unit 111. The power transmitting unit 111 may include: the induction coil unit 111b that includes one or more induction coils for wirelessly supplying power to the electronic device that is charged by the magnetic induction method; and the resonant coil unit 111a that includes one or more resonance coils for wirelessly supplying power to the electronic device that is charged by the magnetic resonance method. The induction coils and the resonance coils may be provided in various positions on the charging apparatus 110 in order to increase the efficiency of the power supply. The resonance coil unit 111a and the induction coil unit 111b may be provided in the portion that abuts the electronic device 150 in order to charge the electronic device 150. The power transmitting unit 111 may include a resonance coil that is formed on the outer portion thereof and one or more induction coils that are formed inside the resonance coil. The power transmitting unit 111 may include one or more coils according to the first wireless power transmitting method and one or more coils according to the second wireless power transmitting method. Alternatively, the power transmitting unit 111 may include the first coil according to the first wireless power transmitting method and one or more of the second coils according to the second wireless power transmitting method, which are positioned in the first coil. The coils configured in the power transmitting unit 111 may have different sizes depending on the arrangement with respect to the electronic device. The coil corresponding to the electronic device among a plurality of coils may be activated under the control of the controller 112 to wirelessly transmit and receive power, and the remaining coils may be inactivated. For example, when the electronic device is placed to correspond to a certain coil, the power transmission or reception may be initiated through the corresponding coil.

According to various embodiments, the driving unit 117 may output power of a predetermined voltage value. The voltage value of the power output from the driving unit 117 may be controlled by the controller 112. A current output from the driving unit 117 may be output to the resonant amplifying unit 118a. In addition, the current output from the driving unit 117 may be output to the induction amplifying unit 118b. The resonance amplifying unit 118a and the induction amplifying unit 118b may amplify a current to a predetermined gain, and may convert a DC power into an AC power based on a signal input from the controller 112. Accordingly, the resonance amplifying unit 118a and the induction amplifying unit 118b may output the AC power.

According to various embodiments, the resonance amplifying unit 118a may amplify the power transferred to one or more resonance coils constituting the resonance coil unit 111a. The induction amplifying unit 118b may amplify the power transferred to one or more induction coils constituting the induction coil unit 111b. The resonance amplifying unit 118a may include an amplifier that is driven according to the AC power output from an AC power generating unit (not shown). The induction amplifying unit 118b may include an inverter to convert a DC voltage output from the driving unit 117 into an AC voltage. The inverter may include four or more transistors, and may output an AC according to the ON/OFF operation of each transistor. The amplifier may operate at a frequency of 6.78 MHz, and may be configured by a high efficiency switching amplifier in class E or class D. The class E amplifier may be comprised of a single transistor and a single capacitor, and the class D amplifier may be comprised of two transistors. The amplifier may execute functions that are performed by the inverter, and the inverter may execute functions that are performed by the amplifier.

According to various embodiments, the matching unit 116 may perform impedance matching. For example, the matching unit 116 may adjust the impedance viewed from the matching unit 116 in order to thereby control the output power to have a high efficiency or high power. The sensor unit 119 may sense a load change caused by the electronic device 150 through the resonance coil unit 111a and the induction coil unit 111b. The sensed result of the sensor unit 119 may be provided to the controller 112. The matching unit 116 may adjust the impedance based on the control of the controller 112. The matching unit 116 may include at least one of a coil or a capacitor. The controller 112 may control the connection state between at least one of the coil or the capacitor included in the matching unit 116 and the resonance coil unit 111a in order to thereby perform impedance matching.

According to various embodiments, the resonance coil unit 111a may transmit the input AC power to the electronic device 150. The resonance coil unit 111a may be implemented by a resonance circuit that has the same resonance frequency as the resonance coil of the electronic device 150, and the resonance frequency may be determined to be 6.78 MHz.

According to various embodiments, the communication unit 113 may communicate with the communication unit 153 of the electronic device 150, and the communication unit 113, for example, may perform the communication (WiFi, ZigBee, or Bluetooth (BT)/Bluetooth low energy (BLE)) with a two-way frequency of 2.4 GHz. The communication unit 113 may transmit a signal (e.g., a power beacon) to the electronic device 150 under the control of the controller 112, and may receive a response (e.g., a broadcast signal) to the transmission of the signal. The charging apparatus 110 may transmit the signal to the electronic device 150, and when a response to the transmitted signal is received through the communication unit 113 (e.g., BLE), the charging apparatus 110 may determine whether or not the electronic device is charged by the magnetic resonance method.

In addition, the communication unit 113 may have its own microcontroller unit (MCU) and general purpose input output (GPIO) pins in the magnetic resonance method, and may adjust the power output from the amplifier. The present disclosure may share the MCU included in the BLE module for out-of-band communication that is used in the magnetic resonance method. The shared MCU may perform in-band communication modulation/demodulation in the magnetic induction method, and may perform the induction power control {e.g., frequency modulation and pulse width modulation (PWM)}. The communication unit 113 may include a communication module that performs short-range communication based on the BLE. In addition, the communication unit 113 may communicate with the electronic device by using one or more antennas under the control of the controller 112. The communication unit 113 may sense the electronic device that is required to be charged or that approaches for the charging through the communication module. Although the controller 112 and the communication unit 113 are illustrated to be separated in FIGS. 1A and 1B, this is only an example, and the out-of-band communication function performed by the communication unit 113 may be executed by the controller 112. In addition, the controller 112 and the communication unit 113 may be designed to be integrated in a single chip.

According to various embodiments, the charging apparatus 110 may further include an AC power generating unit (not shown). The AC power generating unit may generate an AC power in the magnetic resonance method, and the resonance amplifying unit 118a may amplify the AC power output from the AC power generating unit. The AC power generating unit may include an oscillator for generating an AC power of a constant frequency. The AC power generating unit may output the AC power for a resonance coupling between the resonance coil of the charging apparatus 110 and the resonance coil of the electronic device. The frequency of the AC power may be 6.78 MHz.

According to various embodiments, the controller 112 may apply a power beacon for induction detection to the induction coil of the induction coil unit 111b. The controller 112 may periodically apply a power beacon to the induction coil in order to thereby measure the amount of change in the impedance of the induction coil. If the impedance of the induction coil is changed, the controller 112 may detect that the electronic device 150 has been placed on (or has approached) the pad. Thereafter, the controller 112 may transmit a power beacon of a greater power than the power strength of the power beacon to the electronic device 150 in order to thereby activate an induction modulator (not shown) of the electronic device 150. Afterwards, the controller 112 receives a signal for searching for the charging apparatus from the electronic device 150 through the induction modem 120, and performs an induction transmitting device control operation in response to the received signal. The controller 112 may determine that the electronic device 150 is charged by the induction method in response to the reception of the signal input through the induction modem 120.

According to various embodiments, the controller 112 may apply a power beacon for resonance detection to the resonance coils of the resonance coil unit 111a. The controller 112 may periodically apply a beacon power to the resonance coil in order to thereby measure the amount of change in the impedance of the resonance coil. If the impedance of the induction coil is changed, the controller 112 may detect that the electronic device 150 has been placed on (or has approached) the pad. Thereafter, the controller 112 may transmit a power beacon of a greater power than the power strength of the power beacon to the electronic device 150 in order to thereby activate the communication unit 153 (e.g., the BLE) of the electronic device 150. Afterwards, the controller 112 may receive a signal for searching for the charging apparatus from the electronic device 150 through the communication unit 113 (e.g., the BLE), and may transmit a response signal to the received signal to the electronic device 150 through out-of-band communication. The signal for searching for the charging apparatus may contain a BLE-based advertisement signal. The controller 112 may determine that the electronic device 150 is charged by the resonance method in response to the reception of the BLE-based advertisement signal.

According to various embodiments, the controller 112 may apply a power beacon for induction detection to the induction coils of the induction coil unit 111b, and may apply a power beacon for resonance detection to the resonance coils of the resonance coil unit 111a, respectively. The controller 112 may simultaneously apply power beacons to a plurality of induction coils of the induction coil unit 111b. In addition, the controller 112 may determine (or select) the coil of which the amount of change in the impedance is the minimum (for example, the coil of which the performance of the wireless power transmission is best) through the amount of change in the impedance of each induction coil.

According to various embodiments, the controller 112 may: detect one or more electronic devices; determine the charging method corresponding to the detected electronic device; select the coil corresponding to the determined charging method; and wirelessly charge the electronic device. The controller 112 may control a driver to periodically apply a power beacon for induction detection to the induction coil. If the impedance of the induction coil is changed, the controller 112 may detect that the electronic device 150 has been placed on the pad. In addition, the controller 112 may transmit a power beacon of a greater power than the power strength of the power beacon to the electronic device 150 in order to thereby activate the induction modulator (not shown) of the electronic device 150. When a signal for searching for the charging apparatus is received from the electronic device 150 through the induction modem 120, the controller 112 may determine that the electronic device 150 is charged by the induction method.

In addition, the controller 112 may control a driver to periodically apply a power beacon for resonance detection to the resonance coil. If the impedance of the resonance coil is changed, the controller 112 may detect that the electronic device 150 has been placed on the pad. In addition, the controller 112 may transmit a power beacon of a greater power than the power strength of the power beacon to the electronic device 150 in order to thereby activate the communication unit 153 (e.g., the BLE) of the electronic device 150. In addition, when a signal for searching for the charging apparatus is received from the electronic device 150 through the communication unit 113 (e.g., the BLE), the controller 112 may determine that the electronic device 150 is charged by the resonance method.

The power beacon for induction detection and the power beacon for resonance detection may be simultaneously applied to the coils, respectively. The controller 112 may control the driver to apply the power beacon for induction detection and the power beacon for resonance detection to the corresponding coils, and may determine whether the electronic device 150 is charged in the magnetic induction method or in the magnetic resonance method according to whether a response signal is received from the electronic device 150 through the induction modem 120 or through the communication unit 113 (e.g., the BLE).

According to various embodiments, the controller 112 may determine whether to charge the electronic device in the magnetic induction method or in the magnetic resonance method depending on the charging method of the electronic device. When another electronic device is detected during the wireless power transmission to the electronic device, the controller 112 may determine the charging method for the other electronic device, and may wirelessly charge the other electronic device through the coil corresponding to the determined charging method. In addition, when a plurality of electronic devices is detected, the controller 112 may determine the charging method corresponding to each electronic device, and may wirelessly charge each of the plurality of electronic devices through the coil corresponding to the determined charging method.

According to various embodiments of the present disclosure, a charging apparatus for controlling wireless charging may include: a power transmitting unit that adopts a plurality of coils for wirelessly charging one or more electronic devices; and a controller that detects the one or more electronic devices, determines the charging method corresponding to the detected electronic device, and controls the wireless charging of the electronic device by selecting a coif corresponding to the determined charging method.

According to an embodiment, the charging apparatus may further include a power amplifying unit that includes a plurality of amplifiers for amplifying the power supplied to each of the plurality of coils.

According to an embodiment, the charging apparatus may further include a power transmitting unit that adopts one or more induction coils and resonance coils.

According to an embodiment, the controller may control the first driver to transmit a power beacon for resonance detection to the resonance coil, and may control a second driver to transmit a power beacon for induction detection to the induction coil in order to thereby detect the electronic device.

According to an embodiment, when the electronic device is detected, the controller may control the first driver to apply a power beacon for induction detection of a greater power strength than the applied power beacon for induction detection and a power beacon for resonance detection of a greater power strength than the applied power beacon for resonance detection to each corresponding coil.

According to an embodiment, the controller may determine whether the electronic device is to be charged by the magnetic induction method or by the magnetic resonance method according to the charging method of the electronic device According to an embodiment, when a broadcast signal is received from the electronic device through in-band communication in response to the application of the power beacon for induction detection, the controller may determine that the electronic device is to be charged by the magnetic induction method, and when a broadcast signal is received from the electronic device through out-of-band communication in response to the application of the power beacon for resonance detection, the controller may determine that the electronic device is to be charged by the magnetic resonance method.

According to an embodiment, the controller may: transmit a power beacon to each of a plurality of induction coils that are provided in the charging apparatus; measure the amount of change in the impedance of each of the plurality of induction coils; and select the coil for wirelessly providing power to the electronic device based on the amount of change in the impedance.

According to an embodiment, when another electronic device is detected while the electronic device is wirelessly charged, the controller may determine the charging method corresponding to the other electronic device, and may wirelessly provide power to the other electronic device through a coil corresponding to the determined charging method.

According to an embodiment, when a plurality of electronic devices is detected, the controller may determine the charging method corresponding to each electronic device, and may wirelessly provide power to the plurality of electronic devices through a coil corresponding to each determined charging method.

According to an embodiment, the power transmitting unit may include one or more coils according to the first wireless charging method and one or more coils according to the second wireless charging method.

According to an embodiment, the power transmitting unit may include the first coil according to the first wireless charging method and one or more of the second coils according to the second wireless charging method, which are positioned inside the first coil.

Figure 2:
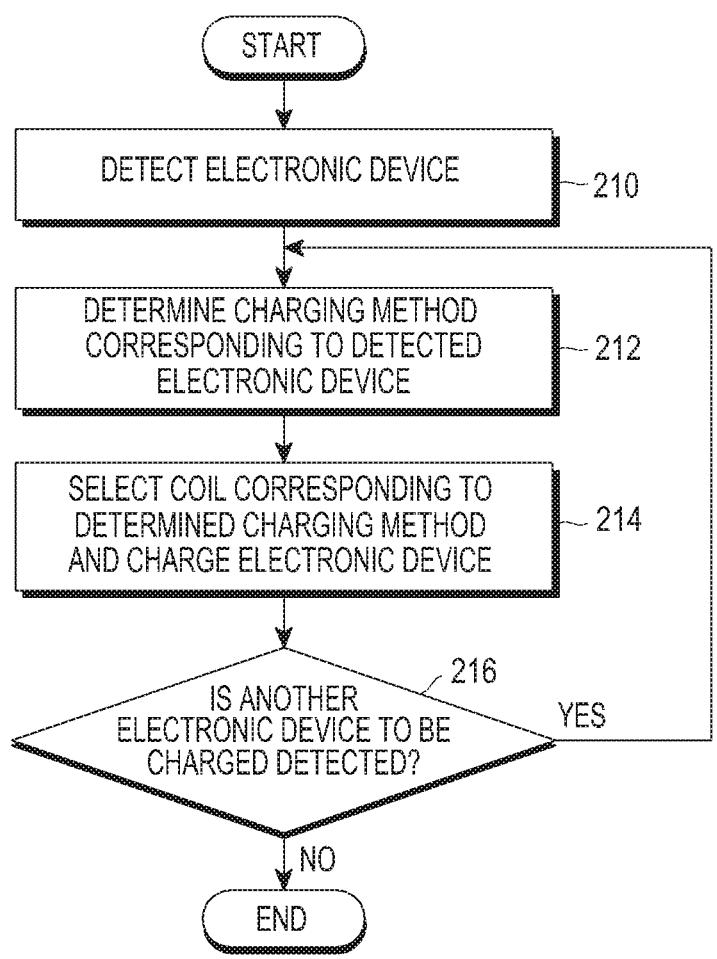
FIG. 2 is a flowchart illustrating a process for controlling wireless charging according to an embodiment of the present disclosure.

FIG. 2 is a flowchart illustrating a process for wirelessly providing power according to an embodiment of the present disclosure.

Hereinafter, a process of wirelessly providing power, according to an embodiment, will be described in detail with reference to FIG. 2.

Referring to FIG. 2, the charging apparatus 110 may detect the approach of the electronic device that is required to be charged at operation 210. The charging apparatus 110 may periodically, or aperiodically, transmit signals (e.g., power beacons) in order to thereby detect the approach of the electronic device. The charging apparatus 110 may apply a power beacon for induction detection to the induction coil of the induction coil unit 111b, and may apply a power beacon for resonance detection to the resonance coil of the resonance coil unit 111a. The charging apparatus 110 may simultaneously apply power beacons to a plurality of induction coils of the induction coil unit 111b. In addition, the charging apparatus 110 may measure a change in the impedance of each induction coil, and may determine that the electronic device is charged in the magnetic induction method according to the measured result. In addition, the charging apparatus 110 may determine (or select) the coil of which the change in the impedance is the minimum (e.g., the coil of which the wireless power transmission performance is highest). In addition, the charging apparatus 110 may transmit a power beacon of a greater power than the power strength of the power beacon to the electronic device 150 in order to thereby activate the communication unit 153 (e.g., the BLE) of the electronic device 150. Afterwards, when a signal (e.g., a broadcast signal) for searching for the charging apparatus is received from the electronic device 150 through the communication unit 113 (e.g., the BLE), the controller 112 may determine that the electronic device 150 is charged by the resonance method.

In addition, the charging apparatus 110 may detect the approach of the electronic device through one or more sensors. The charging apparatus 110 may transmit a power beacon in order to thereby detect the approach of the electronic device. In addition, when a response (e.g., a broadcast signal) to the transmitted power beacon is received from the electronic device that has received the power beacon, the charging apparatus may determine that the electronic device is charged by the magnetic resonance method. When a plurality of electronic devices is placed on the charging pad of the charging apparatus 110, the charging apparatus 110 may transmit a power beacon to each electronic device, and may receive a response signal to the transmitted power beacon in order to thereby determine the charging method of each of the plurality of electronic devices that are placed on the pad. The charging apparatus 110 may detect one or more electronic devices through one or more sensors or through the signal. In addition, the charging apparatus 110 may determine the charging state of the detected electronic device. The charging apparatus 110 may determine whether or not the detected electronic device is required to be charged, and may output the same through charging light emitting diodes (LEDs) in order for the user to recognize the charging state. For example, if the electronic device is in the fully charged state, the charging apparatus may emit a green light through the LED, and if the electronic device is not in the fully charged state, the charging apparatus may emit a red light through the same.

The charging apparatus 110 may determine the charging method corresponding to the detected electronic device at operation 212. The charging apparatus 110 may determine whether the detected electronic device is charged in the magnetic induction method or in the magnetic resonance method according to whether a response signal to the transmitted power beacon is received through the induction modem 120 or through the communication unit 113 (e.g., the BLE). For example, when the response signal to the transmitted power beacon is received through the induction modem, the charging apparatus 110 may determine that the electronic device is charged in the magnetic induction method. In addition, when the response signal (e.g. a broadcast signal) to the transmitted power beacon is received through the communication unit (e.g., the BLE), the charging apparatus 110 may determine that the electronic device is charged in the magnetic resonance method. In addition, for example, when a plurality of electronic devices is detected, the charging apparatus 110 may determine the charging method of each of the plurality of electronic devices. The charging apparatus 110 may determine whether to charge the electronic device by the magnetic induction method or by the magnetic resonance method according to the charging method of the electronic device. When the electronic device is placed on the charging pad of the charging apparatus 110, the charging apparatus 110 may determine the charging method of the placed electronic device in order to thereby determine the coil that is positioned on the portion where the electronic device is placed. In addition, the charging apparatus 110 may charge the electronic device through the determined coil according to the determined charging method. Alternatively, when a plurality of electronic devices is placed on the charging pad of the charging apparatus 110, the charging apparatus 110 may determine the charging method of each of the plurality of electronic devices placed in order to thereby determine the coil that is positioned on the portion where each electronic device is placed. In addition, the charging apparatus 110 may charge each electronic device through the determined coil according to the charging method of each electronic device. Alternatively, the charging apparatus 110 may determine the charging methods of different electronic devices that are required to be charged in different charging methods, and may determine the charging method of the corresponding electronic device through each determined charging method.

The charging apparatus 110 may select the coil corresponding to the determined charging method in order to thereby charge the electronic device at operation 214. The charging apparatus 110 may select the coil that corresponds to the charging method of the electronic device. When the impedance of the induction coil changes in response to the transmitted power beacon, the charging apparatus 110 may select the induction coil, and when the signal is received through the communication unit 113, the charging apparatus 110 may select the resonance coil. The charging apparatus 110 may transmit a power beacon to each of the induction coils constituting the induction coil unit 111a in order to thereby determine (select) the coil of which the change in the impedance is the minimum (e.g., the coil of which the wireless power transmission performance is highest) through the amount of change in the impedance of each induction coil. If a plurality of electronic devices is detected, which are required to be charged, the charging apparatus may select the coil corresponding to the charging method of each electronic device, and may charge the corresponding electronic device through the selected coil. For example, if the electronic device is charged in the magnetic induction method, the charging apparatus 110 may charge the electronic device through the induction coil of the power transmitting unit 111. Alternatively, if the electronic device is charged in the magnetic resonance method, the charging apparatus 110 may charge the electronic device through the resonance coil of the power transmitting unit 111. The power transmitting unit 111 may include one or more resonance coils and one or more induction coils. In addition, the one or more induction coils may be provided in the places where they do not interfere with each other in the resonance coil. The charging apparatus 110 may wirelessly provide power to the electronic device through the selected coil.

The charging apparatus 110 may detect another electronic device while the electronic device is charged at operation 216. The charging apparatus 110 may periodically or aperiodically transmit a power beacon to detect the other electronic device while the electronic device is charged. The charging apparatus 110 may detect the approach of the other electronic device through one or more sensors during the charging of the electronic device. The charging apparatus 110 may transmit a power beacon to determine the charging method of the other electronic device during the charging of the electronic device, and may receive a response to the transmitted power beacon from the other electronic device that has received the power beacon in order to thereby determine the charging method of the other electronic device. Alternatively, if the other electronic device is placed in another position of the charging pad of the charging apparatus 110 while the electronic device is charged, the charging apparatus 110 may determine the charging method of the other electronic device. In addition, the charging apparatus 110 may determine the charging state of the other electronic device. The charging apparatus 110 may determine whether or not the detected electronic device is required to be charged, and may output the same through the charging LEDs in order for the user to recognize the charging state. The charging apparatus 110 may adopt a plurality of LEDs in order to provide the user with the charging states of a plurality of electronic devices. Each of the plurality of LEDs may output a variety of information indicating, for example, that the charging of the corresponding electronic device is in progress or that the charging is complete.

A wireless charging control method of a charging apparatus, according to various embodiments of the present disclosure, may include: detecting one or more electronic devices; determining the charging method corresponding to the detected electronic device; and wirelessly charging the electronic device by selecting a coil corresponding to the determined charging method.

According to an embodiment, the detecting of one or more electronic devices may include transmitting a power beacon for induction detection and a power beacon for resonance detection for detecting the electronic device.

According to an embodiment, the method may further include, when the electronic device is detected, applying a power beacon for induction detection of a greater power strength than the applied power beacon for induction detection and a power beacon for resonance detection of a greater power strength than the applied power beacon for resonance detection to each corresponding coil.

According to an embodiment, the determining of the charging method may include determining whether the electronic device is to be charged by the magnetic induction method or by the magnetic resonance method according to the charging method of the electronic device.

According to an embodiment, the determining of the charging method image: when a broadcast signal is received from the electronic device through in-band communication in response to the application of the power beacon for induction detection, determining that the electronic device is to be charged by the magnetic induction method; and when a broadcast signal is received from the electronic device through out-of-band communication in response to the application of the power beacon for resonance detection, determining that the electronic device is to be charged by the magnetic resonance method.

According to an embodiment, the method may further include: transmitting a power beacon to each of a plurality of induction coils that are provided in the charging apparatus; measuring the amount of change in the impedance of each of the plurality of induction coils; and selecting the coil for wirelessly providing power to the electronic device based on the amount of change in the impedance.

According to an embodiment, the method may further include, when another electronic device is detected while the electronic device is wirelessly charged, determining the charging method corresponding to the other electronic device, and wirelessly providing power to the other electronic device through a coil corresponding to the determined charging method.

According to an embodiment, the method may further include, when a plurality of electronic devices is detected, determining the charging method corresponding to each electronic device, and wirelessly providing power to the plurality of electronic devices through a coil corresponding to each determined charging method.

Figure 3A:
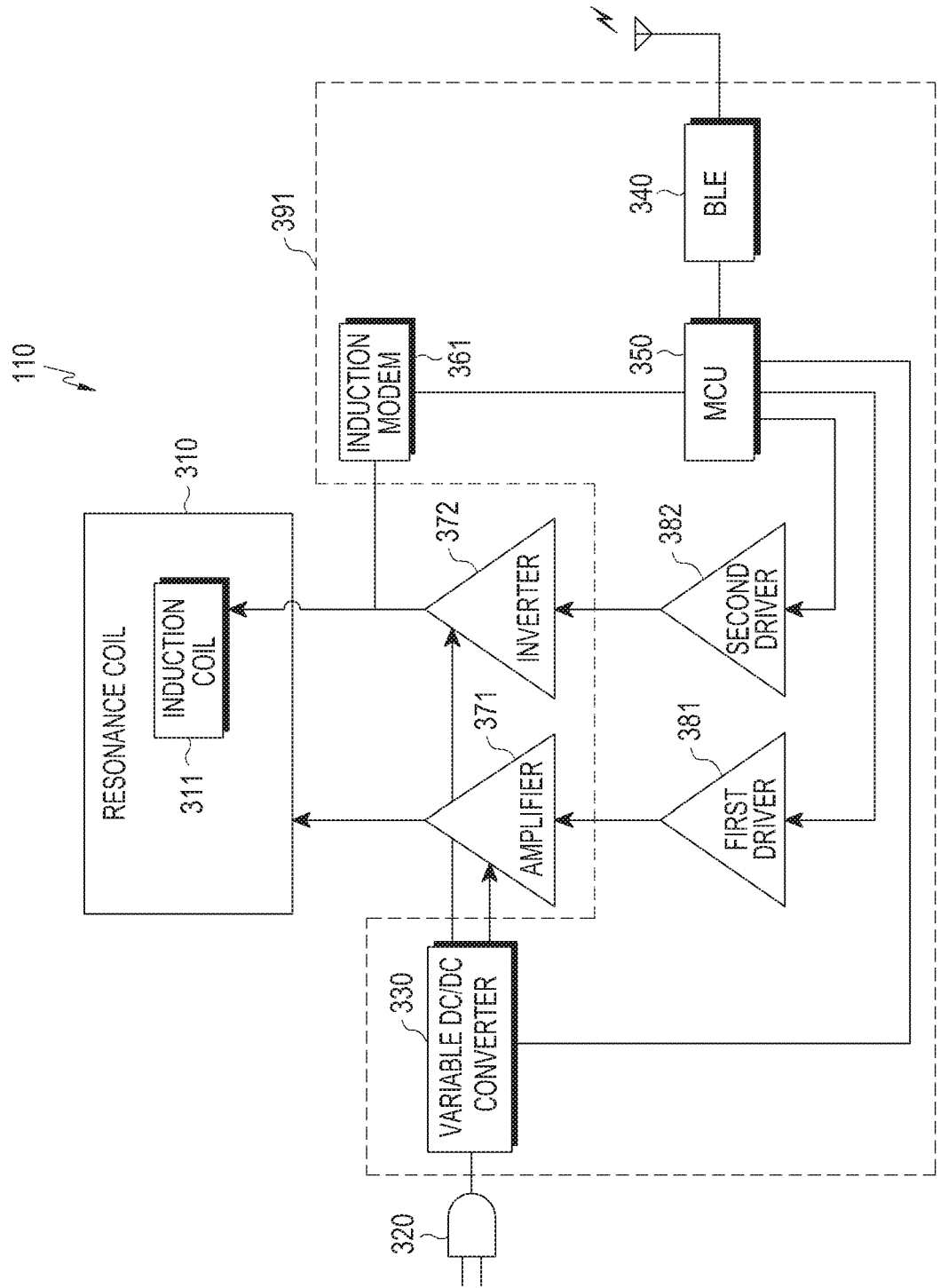
FIG. 3A is a block diagram of a charging apparatus for controlling wireless charging according to an embodiment of the present disclosure.
Figure 3B:
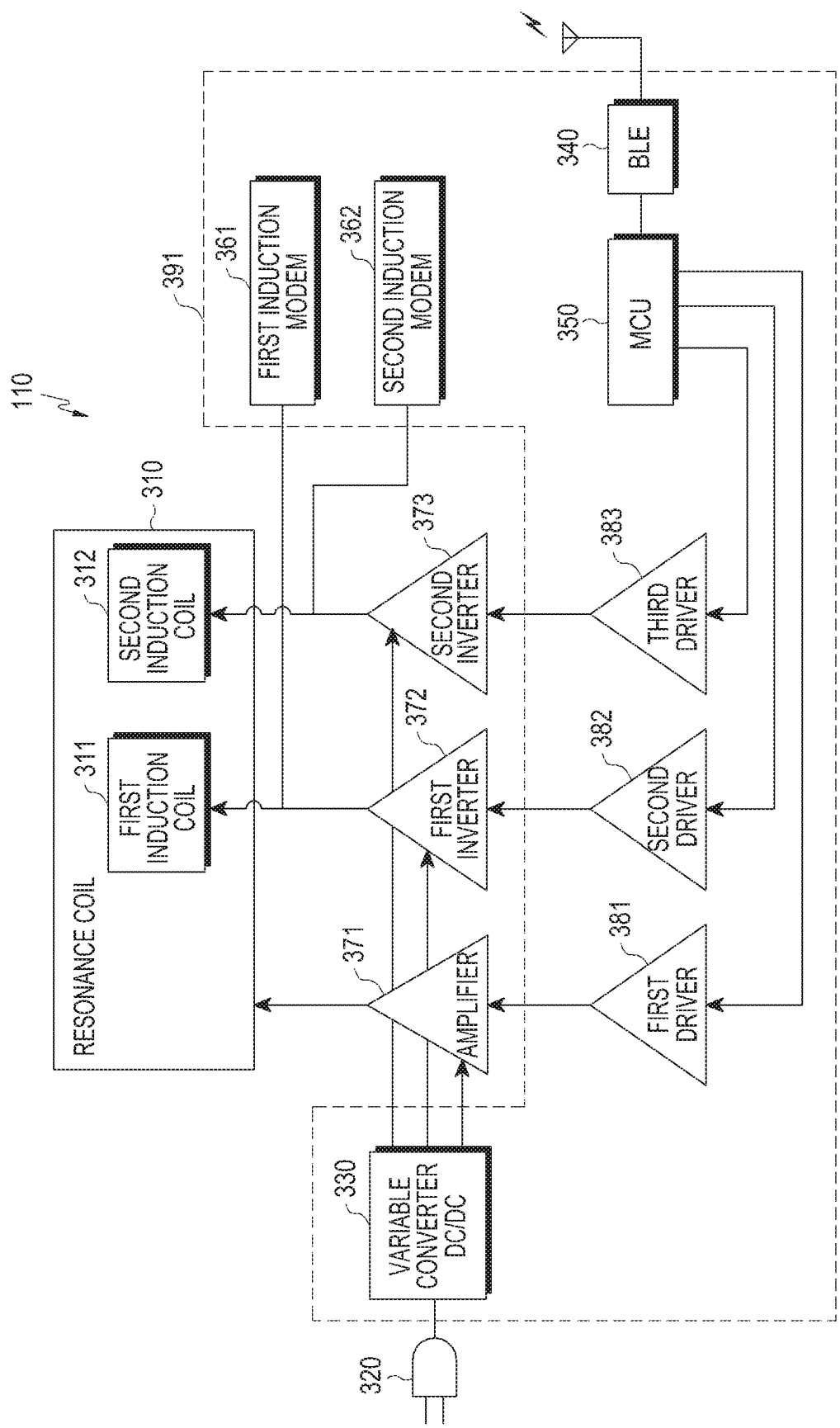
FIG. 3B is a block diagram of a charging apparatus for controlling wireless charging according to another embodiment of the present disclosure.

FIG. 3A is a block diagram of a charging apparatus for wirelessly providing power according to an embodiment of the present disclosure, and FIG. 3B is a block diagram of a charging apparatus for wirelessly providing power according to another embodiment of the present disclosure.

Referring to FIG. 3A, the charging apparatus 110, according to various embodiments, may wirelessly provide power to one or more electronic devices that adopt, for example, a battery or a power source. The charging apparatus 110 may wirelessly provide power to one or more electronic devices by using the magnetic induction method, and may wirelessly provide power to one or more electronic devices by using the magnetic resonance method. The charging apparatus 110 may provide power to the electronic device that is charged by the magnetic induction method and to the electronic device that is charged by the magnetic resonance method at different times or at the same time.

The magnetic induction type of induction coil unit 311 and the magnetic resonance type of resonance coil 310 may be included in the power transmitting unit 111. The power transmitting unit 111 may include one or more induction coils. The induction coil 311 is intended to wirelessly supply power to the electronic device to be charged by the magnetic induction method, and the resonance coil 310 is intended to wirelessly supply power to the electronic device to be charged by the magnetic resonance method. The power transmitting unit 111 may be provided in the portion of the charging apparatus 110, which abuts the electronic device in order to charge the electronic device. Hereinafter, the description will be made according to: a first example in which the charging apparatus 110 wirelessly provides power to the first electronic device through the induction coil when the first electronic device is wirelessly supplied with power through the induction coil; a second example in which the charging apparatus 110 wirelessly provides power to the second electronic device through the resonance coil when the second electronic device is wirelessly supplied with power by the resonance coil; and a third example in which the first electronic device and the second electronic device are wirelessly supplied with power at the same time.

The first example in which the charging apparatus 110 wirelessly provides power to the first electronic device through the induction coil will be described below.

A controller (e.g., an MCU 350) of the charging apparatus 110 may control the second driver 382 to apply a power beacon for induction detection to the induction coil 311 through the inverter 372. The controller (e.g., the MCU 350) may control the second driver 382 to periodically apply a power beacon to the induction coil through the inverter 372, and may measure the amount of change in the impedance of the induction coil. If the impedance of the induction coil varies, the controller (e.g., the MCU 350) may detect that the first electronic device has been placed on (or has approached) the pad. Thereafter, the controller (e.g., the MCU 350) may transmit a power beacon of a greater power than the power strength of the power beacon to the first electronic device in order to thereby activate an induction modulator (not shown) of the first electronic device. Afterwards, when a response signal is received from the first electronic device through the induction modem 361, the controller (e.g., the MCU 350) may determine that the first electronic device is charged by the induction method. The controller (e.g., the MCU 350) may determine that the first electronic device is charged by the induction method by a signal for searching for the charging apparatus. In addition, the adapter 320 of the charging apparatus 110 may convert an AC voltage supplied from the outside into a DC voltage. For example, the adapter 320 may convert an AC voltage of 220V into a DC voltage of 5V or 9V, and may provide the same to a variable DC/DC converter 330. The variable DC/DC converter 330 may boost a DC voltage supplied from the adapter 320 in order to thereby adjust the output power of the inverter 372 provided in the induction amplifying unit 118b. The variable DC/DC converter 330, for example, may boost a DC voltage of 5V or 9V, which is supplied from the adapter 320, to 10V~20V. In addition, the variable DC/DC converter 330 may supply the boosted voltage to the inverter 372.

The inverter 372 may convert a DC voltage supplied from the adapter 320 into an AC voltage. The inverter 372 may adopt four transistors, and may convert a DC voltage into an AC voltage through the ON/OFF operation of each transistor. The ON/OFF operation of each of the four transistors of the inverter 372 may be controlled by the second driver 382. The second driver 382 may supply a current for driving each transistor included in the inverter 372. In addition, the induction modem 361 may detect a change in the power level of the first electronic device, and the controller (e.g., the MCU 350) may control the second driver 382 for controlling the driving of the transistors of the inverter 372. In addition, the controller (e.g., the MCU 350) may adjust the power output from the inverter 372, and may control the induction modem 361 in order to thereby perform in-band communication. The controller (e.g., the MCU 350) may perform communication and control between modules of the charging apparatus 110, and may perform communication and control between the charging apparatus 110 and the electronic device. In addition, the controller (e.g., the MCU 350) may be implemented by an MCU that is included in the out-of-band communication BLE module used in the magnetic resonance method. The shared MCU may perform in-band communication modulation/demodulation, and may perform induction power control (e.g., frequency modulation and PWM). The controller (e.g., the MCU 350) may adjust the power that is output through the inverter 372, and may adjust the frequency. In addition, the power that is output through the inverter 372 controlled by the controller (e.g., the MCU 350) may be supplied to the first electronic device through the induction coil 311 of the power transmitting unit 111.

The second example in which the charging apparatus 110 wirelessly provides power to the second electronic device through the resonance coil will be described as follows.

The controller (e.g., the MCU 350) of the charging apparatus 110 may control the first driver 381 to apply a power beacon for resonance detection to the resonance coil 310 through the amplifier 371. The controller (e.g., the MCU 350) may control the first driver 381 to periodically apply a power beacon to the resonance coil through the amplifier 371, and may measure the amount of change in the impedance of the resonance coil. If the impedance of the resonance coil varies, the controller 112 may detect that the second electronic device has been placed on (or has approached) the pad. Thereafter, the controller (e.g., the MCU 350) may control the first driver 381 to transmit a power beacon of a greater power than the power strength of the power beacon to the second electronic device through the amplifier 371 in order to thereby activate the communication unit 153 (e.g., the BLE) of the second electronic device. Afterwards, when a signal for searching for the charging apparatus is received from the second electronic device through the communication unit 113 (e.g., the BLE 340), the controller (e.g., the MCU 350) may determine that the second electronic device is charged by the resonance method.

The amplifier 371 may operate at a frequency of 6.78 MHz, and may be configured by a high efficiency switching amplifier in class E or class D. The class E amplifier may be comprised of a single transistor and a single capacitor, and the class D amplifier may be comprised of two transistors. The amplifier 371 may amplify and output an AC power based on information that is provided from the MCU 350 according to the voltage level boosted by the DC/DC converter 330. Alternatively, the amplifier 371 may amplify and output an AC power that is output from a separate oscillator (not shown). The oscillator (not shown) may be included in the MCU 350, or may be included in the AC power generating unit (not shown). In addition, the amplifier 371 may execute functions that are performed by the inverter 372, and the inverter 372 may execute functions that are performed by the amplifier 371.

The ON/OFF operation of each of two transistors of the amplifier 371 may be controlled by the first driver 381. The first driver 381 may supply a current for driving the respective transistors that are included in the amplifier 371. In addition, the controller (e.g., the MCU 350) may control the first driver 381 for controlling the driving of the transistors of the amplifier 371. In addition, the controller (e.g., the MCU 350) may adjust the power that is output from the amplifier 371 through the first driver 381, and may communicate with the second electronic device through out-of-band communication. The controller (e.g., the MCU 350) may perform communication and control between modules of the charging apparatus 110, and may perform communication and control between the charging apparatus 110 and the second electronic device. The controller (e.g., the Mat 350) may be implemented by an MCU of a Bluetooth communication module. The controller (e.g., the MCU 350) may control the first driver 381 to adjust the power that is output through the amplifier 371, and may adjust the frequency. In addition, the power that is output through the amplifier 371 controlled by the controller (e.g., the MCU 350) may be supplied to the second electronic device through the resonance coil 310 of the power transmitting unit 111.

The third example in which the charging apparatus 110 wirelessly supplies power to the first electronic device and the second electronic device at the same time by using the induction coil and the resonance coil will be described as follows.

The third example may include the case in which the second example is performed after the first example is performed and the case in which the first example is performed after the second example is performed. For example, the third example may include the case where the second electronic device is charged by the resonance method while the first electronic device is charged by the induction method and the case where the first electronic device is charged by the induction method while the second electronic device is charged by the resonance method. Alternatively, the third example may include the case where the first electronic device is charged by the induction method and the second electronic device is charged by the resonance method at the same time. The third example may include the case where another electronic device is detected while the electronic device is wirelessly supplied with power and the charging apparatus 110 determines the charging method corresponding to the other electronic device in order to thereby wirelessly provide power to the other electronic device through the coil corresponding to the determined charging method. Alternatively, the third example may include the case where a plurality of electronic devices is detected and the charging apparatus determines a charging method corresponding to each electronic device in order to thereby wirelessly provide power to the plurality of electronic devices through the coil corresponding to each determined charging method.

The components shown in FIG. 3A (e.g., the adapter 320, the variable DC/DC converter 330, the amplifier 371, the inverter 372, the induction modem 361, the MCU 350, the BLE 340, the first driver 381, the second driver 382, the induction coil 311, the resonance coil 310, or the like) may, or may not, operate selectively depending on the number of electronic devices to be charged. In addition, the respective components may, or may not, operate selectively depending on the charging method of the electronic device. In addition, the variable DC/DC converter 330, the induction modem 361, the MCU 350, the BLE 340, the first driver 381, and the second driver 382 may be integrated in a single chip 391, and functions or operations that are performed by the components may be carried out by the MCU 350 or by the controller 112.

Referring to FIG. 3B, FIG. 3B shows the second inverter 373, the third driver 383, and the second induction coil 312 in addition to the components of FIG. 3A. FIG. 3B corresponds to the case where two electronic devices are charged by the induction method. Although FIG. 3B shows that two electronic devices are charged by the induction method, three or more electronic devices may be charged by the induction method, or three or more electronic devices may be simultaneously charged by the induction method by adding an inverter, a driver, and an induction coil in the present disclosure. The components of FIG. 3B may perform one or more functions or operations that are performed by the components of FIG. 3A, so the description that has been made above will be omitted.

The charging apparatus 110, according to various embodiments, for example, may wirelessly provide power to a plurality of the electronic devices at the same time by using the magnetic induction method, and may wirelessly provide power to one or more electronic devices by using the magnetic resonance method. The charging apparatus 110 may wirelessly provide power to a plurality of electronic devices that are supplied with power by the magnetic induction method and to an electronic device that is supplied with power by the magnetic resonance method, respectively or at the same time. The charging apparatus 110 may wirelessly charge a plurality of electronic devices in the multi-mode described above.

The power transmitting unit 111 may include two induction coils 311 and 312 in the magnetic induction method and a resonance coil 310 in the magnetic resonance method. The first and second induction coils 311 and 312 are intended to wirelessly supply power to the electronic device to be charged by the magnetic induction method, and the resonance coil 310 is intended to wirelessly supply power to the electronic device to be charged by the magnetic resonance method.

The first inverter 372 of the charging apparatus 110 may convert a DC voltage supplied from the adapter 320 into an AC voltage, and the second inverter 373 may convert a DC voltage supplied from the adapter 320 into an AC voltage. Each of the first inverter 372 and the second inverter 373 may include four transistors, and may convert a DC voltage into an AC voltage through the ON/OFF operation of each transistor. The ON/OFF operation of each of the four transistors of the first inverter 372 and the second inverter 373 may be controlled by the second driver 382 and the third driver 383, respectively. The second driver 382 may supply a current for driving each of the transistors included in the first inverter 372. The third driver 383 may supply a current for driving each of the transistors included in the second inverter 373. The first induction modem 361 and the second induction modem 362 may detect a change in the power level of each electronic device, and the MCU 350 may control the second driver 382 and the third driver 383 for controlling the driving of transistors of the first inverter 372 and the second inverter 373, respectively. In addition, the MCU 350 may adjust the power output from the first inverter 372 and second inverter 373. The MCU 350 may perform communication and control between modules of the charging apparatus 110. In addition, the MCU 350 may control the activation or inactivation of a corresponding induction coil, a corresponding inverter, a corresponding driver, or a corresponding modem of the power transmitting unit 111 depending on the number of electronic devices to be charged by the induction method. The MCU 350 may adjust the power output through the first inverter 372 and the second inverter 373. In addition, the power output through the first inverter 372 and second inverter 373 controlled by the MCU 350 may be supplied to the corresponding electronic device through the first induction coil 311 and the second induction coil 312, respectively.

Hereinafter, the description will be made according to a fourth example in which the charging apparatus 110 wirelessly provides power to the first electronic device through the induction coil when the first electronic device is wirelessly supplied with power through the induction coil; a fifth example in which the charging apparatus 110 wirelessly provides power to the second electronic device through the resonance coil when the second electronic device is wirelessly supplied with power by the resonance coil; and a sixth example in which the charging apparatus 110 wirelessly provides power to the first electronic device and the third electronic device through at least two induction coils, respectively, when the first electronic device and the third electronic device are wirelessly supplied with power through the induction coils, respectively.

The fourth example in which the charging apparatus 110 wirelessly provides power to the first electronic device through the induction coil will be described as follows. The MCU 350 of the charging apparatus 110 may control the second driver 382 to apply a power beacon for induction detection to the induction coil 311 through the inverter 372. The MCU 350 may control the second driver 382 to periodically apply a power beacon to the induction coil through the inverter 372, and may measure the amount of change in the impedance of the induction coil 311 through the induction modem 361. If the impedance of the induction coil 311 varies, the MCU 350 may detect that the first electronic device has been placed on (or has approached) the pad. Thereafter, the MCU 350 may re-apply a power beacon of a greater power than the power strength of the power beacon to the induction coil 311 in order to thereby activate an induction modulator (not shown) of the first electronic device. Afterwards, when a signal for searching for the charging apparatus is received from the first electronic device through the induction modem 361, the MCU 350 may determine that the first electronic device is charged by the induction method. The MCU 350 may wirelessly provide power to the electronic device through the induction coil 311.

The fifth example in which the charging apparatus 110 wirelessly provides power to the second electronic device through the resonance coil will be described as follows. The MCU 350 of the charging apparatus 110 may control the first driver 381 to apply a power beacon for resonance detection to the resonance coil 310 through the amplifier 371. The MCU 350 may control the first driver 381 to periodically apply a power beacon to the resonance coil through the amplifier 371, and may measure the amount of change in the impedance of the resonance coil. If the impedance of the resonance coil varies, the MCU 350 may detect that the second electronic device has been placed on (or has approached) the pad. Thereafter, the MCU 350 may control the first driver 381 to transmit a power beacon of a greater power than the power strength of the power beacon to the second electronic device through the amplifier 371 in order to thereby activate the communication unit 153 (e.g., the BLE) of the second electronic device. Afterwards, when a signal for searching for the charging apparatus is received from the second electronic device through the BLE 340, the MCU 350 may determine that the second electronic device is charged by the resonance method. In addition, the MCU 350 may wirelessly provide power to the electronic device through the resonance coil 310.

The sixth example in which the charging apparatus 110 wirelessly provides power to the first electronic device and the third electronic device through the first induction coil 311 and the second induction coil 312 will be described as follows. The MCU 350 of the charging apparatus 110 may control the second driver 382 and the third driver 383 to apply power beacons for induction detection to the first induction coil 311 and the second induction coil 312 through the first inverter 372 and the second inverter 373, respectively. The MCU 350 may control the second driver 382 and the third driver 383 to periodically apply power beacons to the induction coils through the first inverter 372 and the second inverter 373, and may measure the amount of change in the impedance of each of the first induction coil 311 and the second induction coil 312 through the first induction modem 361 and the second induction modem 362, respectively. If the impedance of the first induction coil 311 and the second induction coil 312 varies, the MCU 350 may detect that the first electronic device and the third electronic device have been placed on (or have approached) the pad. Thereafter, the MCU 350 may re-apply a power beacon of a greater power than the power strength of the power beacon to the first induction coil 311 and the second induction coil 312 in order to thereby activate induction modulators (not shown) of the first electronic device and the third electronic device. Afterwards, when response signals are received from the first electronic device and the third electronic device through the induction modem 361, the MCU 350 may determine that the first electronic device and the third electronic device are charged by the induction method. In addition, the MCU 350 may wirelessly provide power to the first electronic device through the first induction coil 311, and may wirelessly provide power to the third electronic device through the second induction coil 312.

Figure 4:
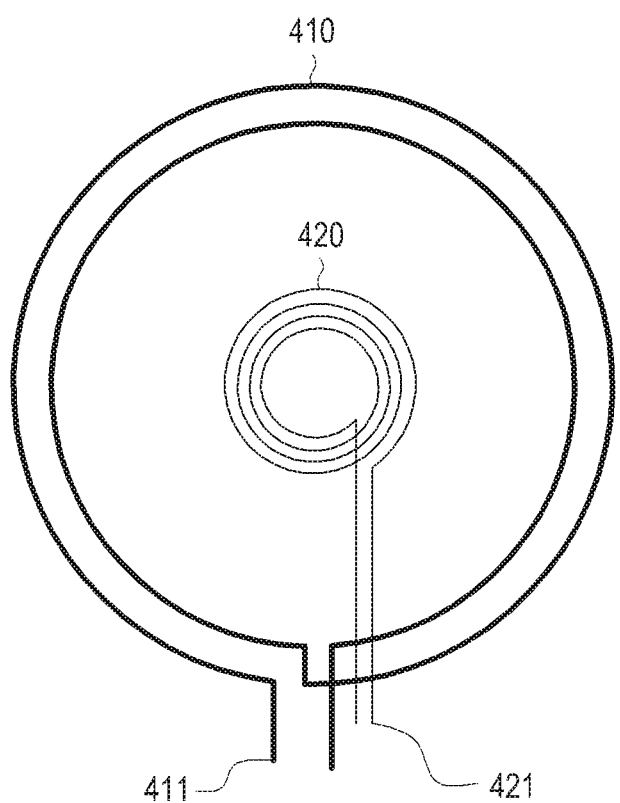
FIG. 4 is a view illustrating a coil unit that is comprised of a single resonant coil and a single induction coil according to an embodiment of the present disclosure.

FIG. 4 is a view illustrating a power transmitting unit that is comprised of a single resonant coil and a single induction coil according to an embodiment of the present disclosure.

Referring to FIG. 4, the coils (e.g., the resonance coil and the induction coil) constituting the power transmitting unit 111 may be configured in a single printed circuit board (PCB). The power transmitting unit 111 may include an induction coil 420 for wirelessly supplying power to the electronic device to be charged by the magnetic induction method and a resonance coil 410 for supplying power to the electronic device to be charged by the magnetic resonance method. Each coil may be formed in a spiral form, and may be provided in various positions to increase the efficiency of the power supply. The power transmitting unit 111 may be provided in the portion that abuts the electronic device in order to charge the electronic device. The resonance coil 410 may be formed in the outer portion, and the induction coil 420 may be positioned inside the resonance coil. The coils 410 and 420 constituting the power transmitting unit 111 may have different sizes depending on the arrangement with respect to the electronic device. In addition, the coils 410 and 420 may be activated under the control of the controller 112 in order to thereby wirelessly transmit and receive power, or may be inactivated. In addition, the coils 410 and 420 may be supplied with a current through the input terminals 411 and 421 to generate an electromotive force. One induction coil and one resonance coil may be produced in a single PCB process. In addition, since the one induction coil and the one resonance coil have separate input and output terminals, respectively, the insulating property between the induction coil and the resonance coil is good so that the influences of the transmission end matching and a transmission filter may be minimized.

Figure 5A:
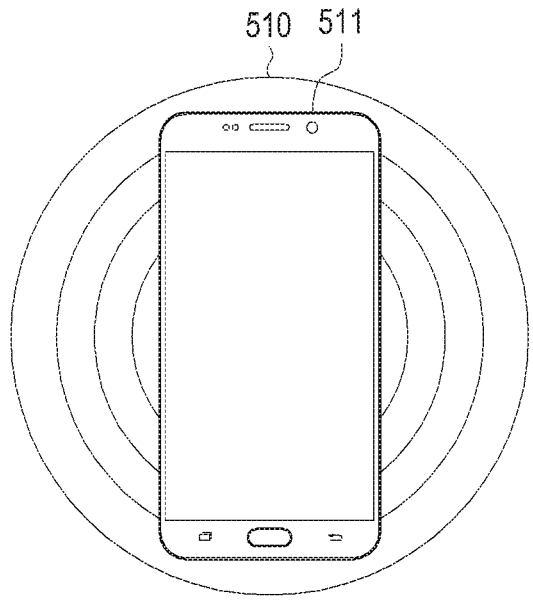
FIG. 5A illustrates an example in which an electronic device that is charged by an induction method is placed on a charging apparatus that adopts a single induction coil and a single resonance coil according to an embodiment of the present disclosure.
Figure 5B:
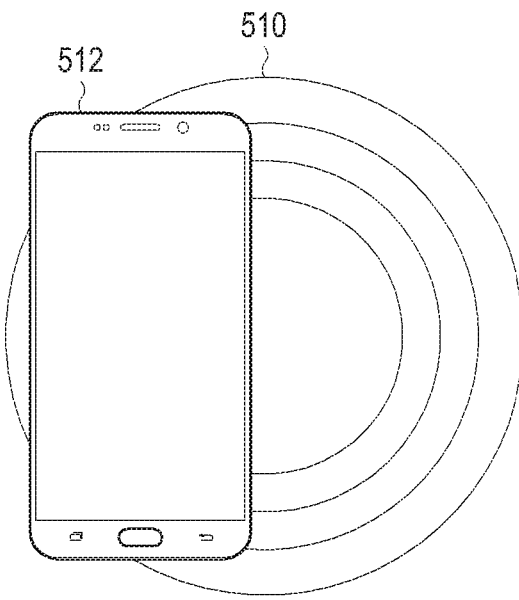
FIG. 5B illustrates an example in which an electronic device that is charged by a resonance method is placed on a charging apparatus that adopts a single induction coil and a single resonance coil according to an embodiment of the present disclosure.
Figure 5C:
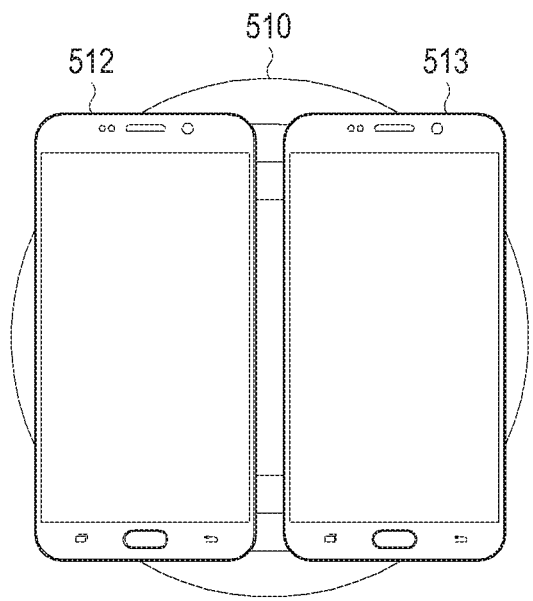
FIG. 5C illustrates an example in which two electronic devices that are charged by a resonance method are placed on a charging apparatus that adopts a single induction coil and a single resonance coil according to an embodiment of the present disclosure.
Figure 5D:
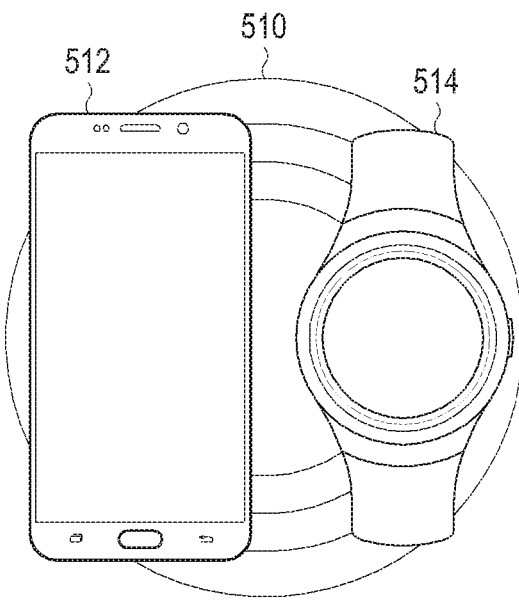
FIG. 5D illustrates another example in which an electronic device that is charged by an induction method is placed on a charging apparatus that adopts a single induction coil and a single resonance coil according to an embodiment of the present disclosure.

FIG. 5A illustrates an example in which an electronic device to be charged by the induction method is placed on the charging apparatus that adopts a single induction coil and a single resonance coil according to an embodiment of the present disclosure. FIG. 5B illustrates an example in which an electronic device to be charged by the resonance method is placed on the charging apparatus that adopts a single induction coil and a single resonance coil according to an embodiment of the present disclosure. FIG. 5C illustrates an example in which two electronic devices to be charged by the resonance method are placed on the charging apparatus that adopts a single induction coil and a single resonance coil according to an embodiment of the present disclosure. FIG. 5D illustrates another example in which an electronic device to be charged by the induction method is placed on the charging apparatus that adopts a single induction coil and a single resonance coil according to an embodiment of the present disclosure.

Referring to FIG. 5A, the charging apparatus 510, according to an embodiment of the present disclosure, may adopt one or more induction coils and one or more resonance coils in the charging pad. For example, the charging apparatus 510 may include one or more induction coils for wirelessly supplying power to the electronic device to be charged by the magnetic induction method and one or more resonance coils for supplying power to the electronic device to be charged by the magnetic resonance method. The coil according to the magnetic induction method may be formed inside the coil according to the magnetic resonance method. The induction coil and the resonance coil may be provided in various positions in order to increase the efficiency of the power supply. The electronic device 511 may be charged by the magnetic induction method, and may include an induction coil. As described above, when the induction coil configured in the electronic device 511 and the induction coil configured in the charging apparatus 510 are aligned with each other, the electronic device 511 may be charged at a high charging efficiency. If a single induction coil is provided in the charging apparatus 510, the induction coil may be provided in the center of the pad.

Referring to FIG. 5B, the charging apparatus 510 may adopt a resonance coil provided in the outer portion of the charging pad. In addition, the electronic device 512 may be charged by the magnetic resonance method, and may include a resonance coil. Since the resonance coil is formed in the outer portion of the charging pad of the charging apparatus 510 and charges the electronic device 512 by using a resonance frequency, the electronic device 512 may be positioned in the outer portion of the charging apparatus 510 and may be charged, even though it is spaced apart from the charging apparatus 510 within a predetermined distance therefrom. The electronic device 512 may be wirelessly supplied with power through a resonance coupling between the resonance coil configured in the electronic device 512 and the resonance coil configured in the charging apparatus 510.

Referring to FIG. 5C, when two electronic devices 512 and 513, which are charged by the resonance method, are placed on the charging pad, the charging apparatus 510 may simultaneously charge the two electronic devices 512 and 513. Since the resonance coil is formed in the outer portion of the pad of the charging apparatus 510 and charges two electronic devices 512 and 513 by using a resonance frequency, the two electronic devices 512 and 513 may be positioned in the outer portion of the charging apparatus 510, and may be charged even though they are spaced apart from the charging apparatus 510 within a predetermined distance therefrom. Each of the two electronic devices 512 and 513 may be wirelessly supplied with power through a resonance coupling between its own resonance coil and the resonance coil configured in the charging apparatus 510. The two electronic devices 512 and 513 may include devices, such as smart phones, cellular phones, or the like Referring to FIG. 5D, the charging apparatus 510 having a single resonance coil may simultaneously charge two different types of electronic devices 512 and 514 that are charged by the resonance method. Since the resonance coil is formed in the outer portion of the pad of the charging apparatus 510 and charges two electronic devices 512 and 514 by using a resonance frequency, the two electronic devices 512 and 514 may be positioned in the outer portion of the charging apparatus 510, and may be charged even though they are spaced apart from the charging apparatus 510 within a predetermined distance therefrom. Each of the two electronic devices 512 and 514 may be charged through a resonance coupling between its own resonance coil and the resonance coil configured in the charging apparatus 510. The electronic device 514 may include a wearable device, such as a gear, a smart watch, or the like.

Figure 6:
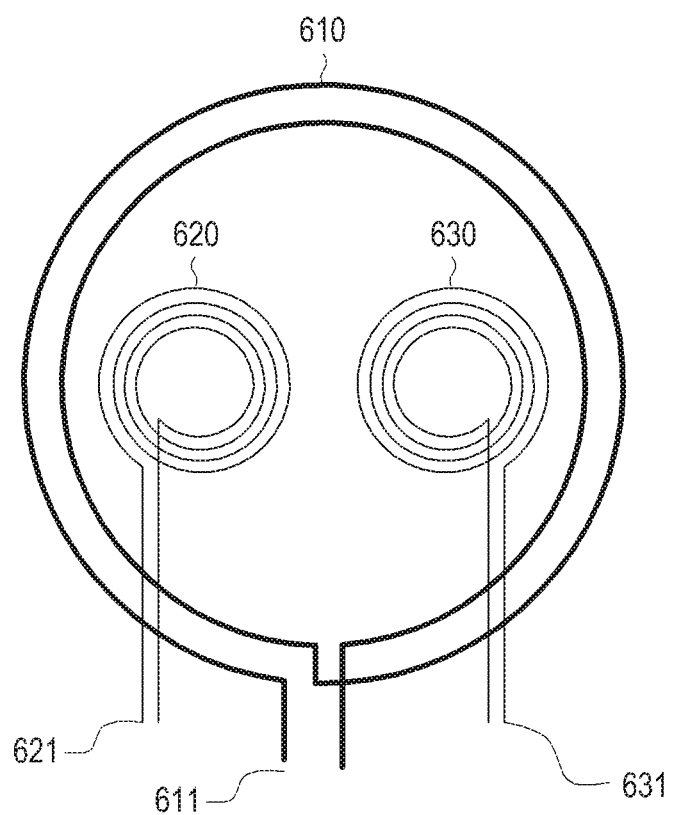
FIG. 6 is a view illustrates a coil unit that is comprised of a single resonant coil and two induction coils according to an embodiment of the present disclosure.

FIG. 6 is a view illustrating a power transmitting unit of a charging apparatus, which is comprised of a single resonant coil and two induction coils according to an embodiment of the present disclosure.

Referring to FIG. 6, the coils (e.g., a resonance coil and one or more induction coils) configured in the power transmitting unit 111 of the charging apparatus may be configured in a single PCB. The power transmitting unit 111 may include two induction coils 620 and 630 (or three or more induction coils) for wirelessly supplying power to the electronic device that is charged by the magnetic induction method and a resonance coil 610 for wirelessly supplying power to the electronic device that is charged by the magnetic resonance method. Each coil 610, 620, or 630 may be formed in a spiral form, and may be provided in various positions to increase the efficiency of the power supply. The power transmitting unit 111 may be provided in the portion that abuts the electronic device in order to charge the electronic device. The resonance coil 610 may be formed in the outer portion, and the two induction coils 620 and 630 may be formed in different positions from each other depending on the arrangement with respect to the electronic device. In addition, the charging apparatus 110 of the present disclosure may form three or more induction coils, as well as two induction coils. In addition, each of the coils 610, 620, and 630 may wirelessly transmit and receive power under the control of the controller 112. In addition, the coils 610, 620, and 630 may be supplied with a current through the input terminals 611, 621, and 631 to generate an electromotive force. The two induction coils 620 and 630 may be formed to be spaced a predetermined distance from each other in order to not interfere with each other, and the sizes thereof may be adjusted to correspond to the size of the induction coil provided in the electronic device. The two induction coils and the one resonance coil may be produced in a single PCB process. In addition, since the induction coil and the resonance coil have separate input and output terminals, respectively, the insulating property between the induction coil and the resonance coil is excellent so that the influences of the transmission end matching and a transmission filter may be minimized. As described above, since two induction coils and one resonance coil can be produced in a single PCB process, a resonator including two induction coils and one resonance coil can be produced at the same cost that a resonator including one induction coil and one resonance coil is produced.

Figure 7A:
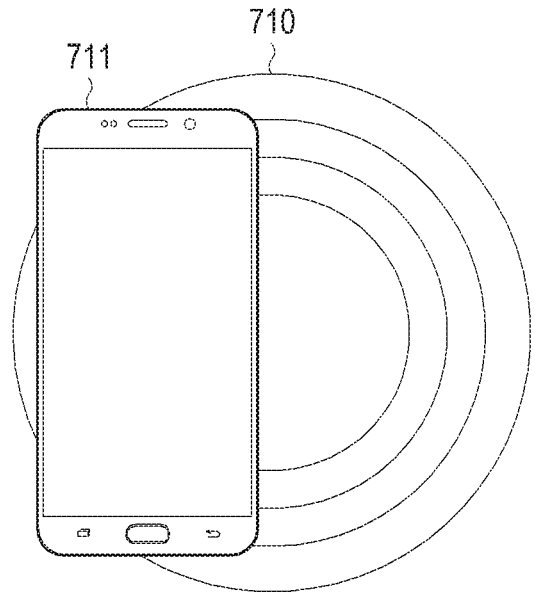
FIG. 7A illustrates an example in which an electronic device that is charged by an induction method is placed on a charging apparatus that adopts two induction coils and a single resonance coil according to an embodiment of the present disclosure.
Figure 7B:
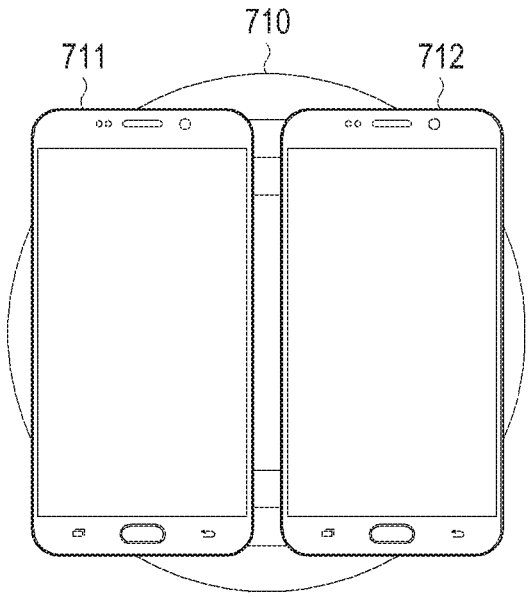
FIG. 7B illustrates an example in which two electronic devices that are charged by an induction method are placed on a charging apparatus that adopts two induction coils and a single resonance coil according to an embodiment of the present disclosure.
Figure 7C:
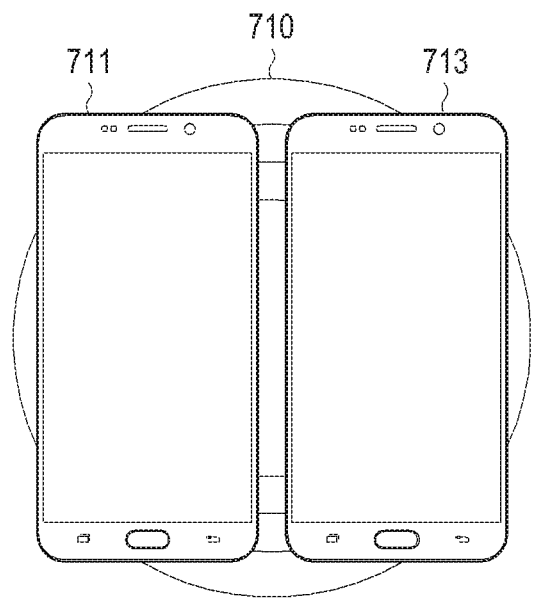
FIG. 7C illustrates an example in which one electronic device that is charged by an induction method and another electronic device that is charged by a resonance method are placed on a charging apparatus that adopts two induction coils and a single resonance coil according to an embodiment of the present disclosure.
Figure 7D:
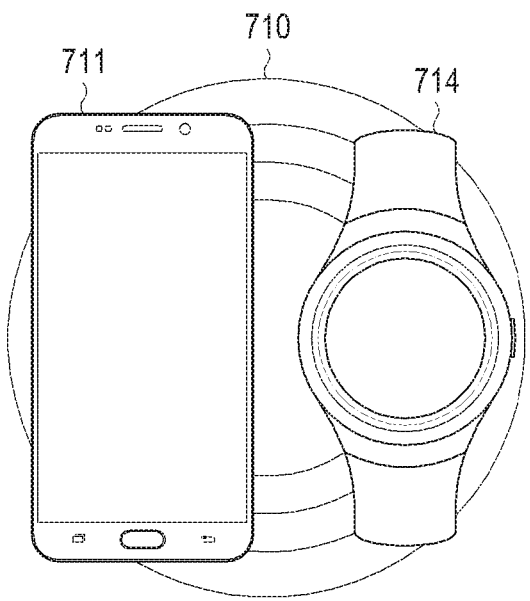
FIG. 7D illustrates another example in which one electronic device that is charged by an induction method and another electronic device that is charged by a resonance method are placed on a charging apparatus that adopts two induction coils and a single resonance coil according to an embodiment of the present disclosure.

FIG. 7A illustrates an example in which an electronic device to be charged by the induction method is placed on the charging apparatus that adopts two induction coils and one resonance coil according to an embodiment of the present disclosure, and FIG. 7B illustrates an example in which two electronic devices to be charged by the induction method are placed on the charging apparatus that adopts two induction coils and one resonance coil according to an embodiment of the present disclosure. FIG. 7C illustrates an example in which an electronic device to be charged by the induction method and an electronic device to be charged by the resonance method are placed on the charging apparatus that adopts two induction coils and one resonance coil according to an embodiment of the present disclosure, and FIG. 7D illustrates another example in which an electronic device to be charged by the induction method and an electronic device to be charged by the resonance method are placed on the charging apparatus that adopts two induction coils and one resonance coil according to an embodiment of the present disclosure.

Referring to FIG. 7A, the charging apparatus 710, according to an embodiment of the present disclosure, may adopt a plurality of induction coils and resonance coils in the charging pad. For example, the charging apparatus 710 may include two or more induction coils for wirelessly supplying power to the electronic device to be charged by the magnetic induction method and one or more resonance coils for wirelessly supplying power to the electronic device to be charged by the magnetic resonance method. The two or more coils, according to the magnetic induction method, may be formed inside the coil according to the magnetic resonance method. The plurality of induction coils and resonance coils may be provided in various positions in order to increase the efficiency of the power supply. In addition, the plurality of induction coils and resonance coils may be provided in the positions where the mutual interference is low. The electronic device 711 may be charged by the magnetic induction method, and may include an induction coil. The charging apparatus 710 may transmit a signal for detecting the electronic device, and may receive a response to the transmitted signal in order to thereby determine the charging method of the electronic device. When a signal is received from the electronic device 711 through a communication unit, the charging apparatus 710 may determine that the electronic device 711 is charged by the resonance method, and when a signal is received from the electronic device 711 through an induction modulator, the charging apparatus 710 may determine that the electronic device 711 is charged by the induction method.

Alternatively, when the electronic device is placed on the pad, the charging apparatus 710 may transmit a signal for detecting the electronic device, and may receive a response to the transmitted signal in order to thereby determine the charging method of the electronic device. In addition, the charging apparatus 710 may transmit a power beacon to each of the induction coils constituting the induction coil unit, and may determine (or select) the coil of which the amount of change in the impedance is minimal (e.g., the coil of which the wireless power transmission performance is highest) through the amount of change in the impedance of each induction coil. The charging apparatus may determine an induction coil that has an optimal wireless power supply efficiency with respect to the electronic device 711 among a plurality of induction coils provided in the pad, and may wirelessly provide power to the electronic device 711 through the determined induction coil. When the induction coil configured in the electronic device 711 and the induction coil configured in the charging apparatus 710 are aligned with each other, the electronic device 711 may be charged at a high charging efficiency. If the charging apparatus 710 has two induction coils, the induction coils may be provided on the left and right sides of the pad or on the upper and lower sides. The induction coils may be provided in the positions where an optimum charging efficiency can be obtained in consideration of the number of induction coils, the influence of interference, or the like.

Referring to FIG. 7B, the electronic devices 711 and 712 may be charged through the induction coils that are provided on the left and right sides, or on the upper and lower sides, of the charging pad. In addition, the electronic devices 711 and 712 may be charged by the magnetic induction method, and may include an induction coil. Each of the electronic devices 711 and 712 may be charged through a coupling between its own induction coil and the induction coil configured in the charging apparatus 710. When the plurality of electronic devices 711 and 712 are placed on the pad, the charging apparatus 710 may transmit signals for detecting the plurality of electronic devices 711 and 712, and may receive responses to the transmitted signals in order to thereby determine the charging methods of the electronic devices 711 and 712. The charging apparatus 710 may apply a power beacon for induction detection to each induction coil in order to thereby measure the amount of change in the impedance of each induction coil, and may transmit a power beacon of a greater power than the power strength of the power beacon to the electronic devices 711 and 712 in order to thereby activate an induction modulator of each electronic device. Afterwards, the charging apparatus 710 may receive a response signal for searching for the charging apparatus from each electronic device through an induction modem, and may determine that the electronic devices 711 and 712 are charged by the induction method.

Alternatively, when a plurality of electronic devices 711 and 712 are placed on the pad, the charging apparatus 710 may transmit a signal for detecting each electronic device, and may receive a response to the transmitted signal in order to thereby determine the charging method of each electronic device. In addition, the charging apparatus may determine an induction coil that has an optimal wireless power efficiency with respect to each of the electronic devices 711 and 712 among a plurality of induction coils provided in the pad, and may wirelessly provide power to the electronic devices 711 and 712 through the determined induction coil. The charging apparatus 710 may transmit a power beacon to each induction coil constituting the induction coil unit, and may determine (or select) the coil of which the amount of change in the impedance is minimal (e.g., the coil of which the wireless power transmission performance is highest) through the amount of change in the impedance of each induction coil.

Referring to FIG. 7C, when the electronic device 711 to be charged by the induction method and the second electronic device 713 to be charged by the resonance method are placed on the pad, the charging apparatus 710 may simultaneously charge the electronic devices 711 and 713. As described above, the charging apparatus 710 may adopt a plurality of induction coils for charging a plurality of electronic devices by the induction method, and may adopt a resonance coil for charging an electronic device by the resonance method. The plurality of induction coils may be provided on the left and right sides, or on the upper and lower sides, of the charging pad of the charging apparatus 710. In addition, the resonance coil may be formed in the outer portion of the charging pad of the charging apparatus 710, and may charge the second electronic device 713 through a resonance frequency. The electronic device may be charged, even though it is spaced apart from the charging apparatus 710 within a predetermined distance therefrom. The first electronic device 711 may be charged through one induction coil, and the second electronic device 713 may be charged through a resonance coupling between the resonance coil configured in the second electronic device 713 and the resonance coil configured in the charging apparatus 710. The two electronic devices 711 and 713 may include devices, such as smart phones, cellular phones, or the like.

Referring to FIG. 7D, when the first electronic device 711 to be charged by the induction method and the third electronic device 714 to be charged by the resonance method are placed on the pad, the charging apparatus 710 may simultaneously charge the electronic devices 711 and 714. As described above, the charging apparatus 710 may adopt a plurality of induction coils for charging a plurality of electronic devices by the induction method, and may adopt a resonance coil for charging an electronic device by the resonance method. The plurality of induction coils may be provided on the left and right sides, or on the upper and lower sides, of the charging pad of the charging apparatus 710. In addition, the resonance coil may be formed in the outer portion of the charging pad of the charging apparatus 710, and may charge the third electronic device 714 through a resonance frequency. The electronic device 714 may be charged, even though it is spaced apart from the charging apparatus 710 within a predetermined distance therefrom. The first electronic device 711 may be charged through one induction coil, and the third electronic device 714 may be charged through a resonance coupling between the resonance coil configured in the third electronic device 714 and the resonance coil configured in the charging apparatus 710. The third electronic device 714 may include a wearable device, such as a gear, a smart watch, or the like.

Figure 8:
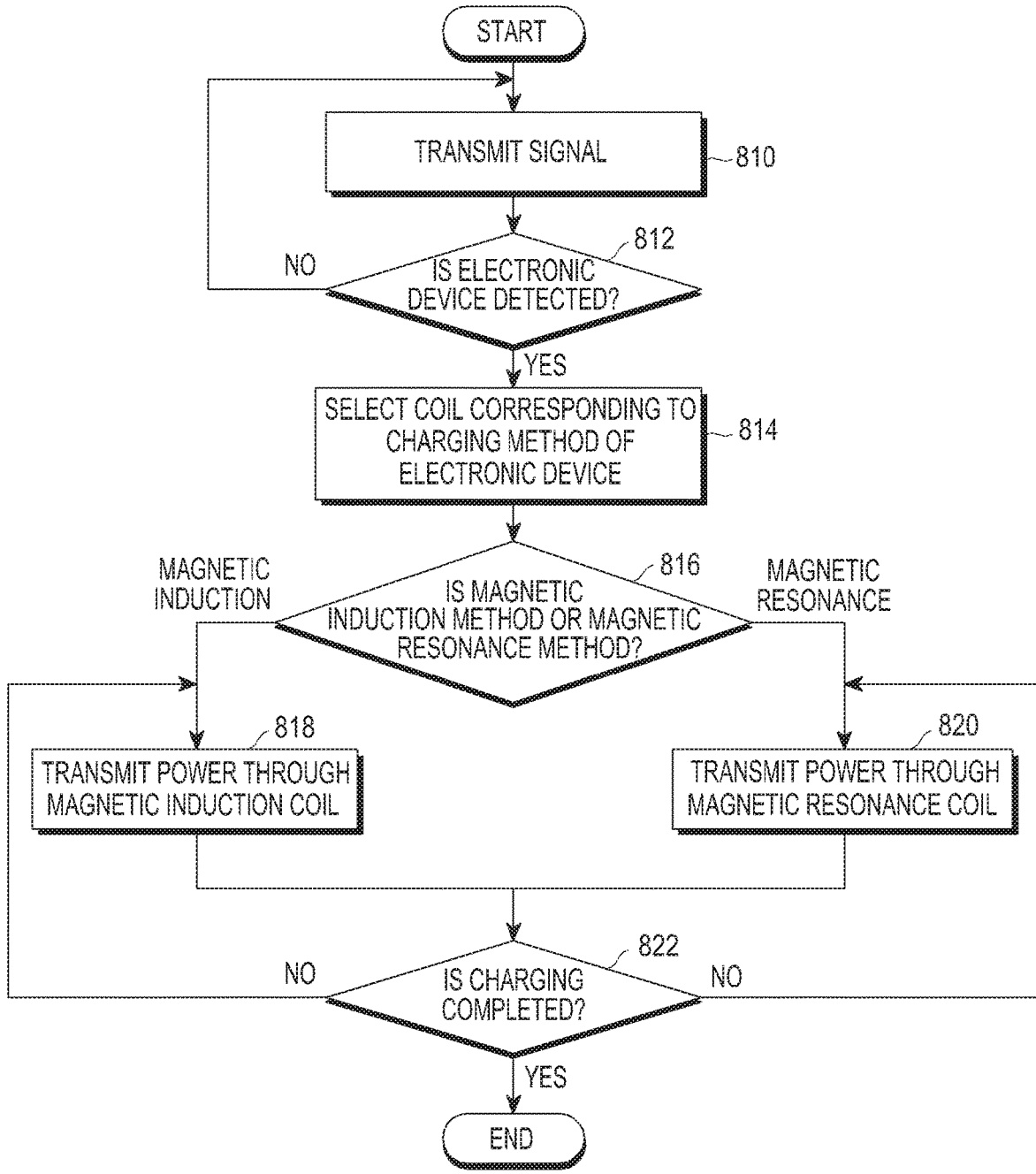
FIG. 8 is a flowchart illustrating a process for controlling wireless charging, according to another embodiment of the present disclosure.

FIG. 8 is a flowchart illustrating a process for wirelessly providing power, according to another embodiment of the present disclosure.

Referring to FIG. 8, the process for wirelessly providing power, according to another embodiment of the present disclosure, will be described in detail with reference to FIG. 8.

The charging apparatus 110 may transmit a signal in order to determine the charging method of at least one electronic device at operation 810. The charging apparatus 110 may transmit one or more power beacons in order to thereby determine the charging method of the electronic device. The charging apparatus 110 may apply a power beacon for induction detection to an induction coil, and may apply a power beacon for resonance detection to a resonance coil. The charging apparatus 110 may transmit a power beacon of a greater power than the power strength of the power beacon to the electronic device 150. When the power beacon is received, the induction type of electronic device may activate an induction modulator in order to thereby transmit a signal for searching for the charging apparatus 110 to the charging apparatus 110 through in-band communication. When the power beacon is received, the resonance type of electronic device may activate a communication unit (e.g., the BLE) in order to thereby transmit a signal for searching for the charging apparatus 110 to the charging apparatus 110 through out-of-band communication. When a signal is received from the electronic device 150 through the communication unit (e.g., the BLE), the charging apparatus 110 may determine that the electronic device 150 is to be charged by the resonance method. In addition, when a signal is received from the electronic device 150 through the induction modulator, the charging apparatus 110 may determine that the electronic device 150 is to be charged by the induction method.

When responses to the transmitted power beacon are received from one or more electronic devices, the charging apparatus 110 may analyze the received responses in order to thereby determine the charging method of each electronic device. The charging apparatus 110 may periodically or aperiodically transmit the power beacon.

When an electronic device is placed on the charging pad of the charging apparatus 110, the charging apparatus 110 may transmit a signal for detecting the electronic device, and may receive a response to the transmitted signal in order to thereby determine the charging method of the electronic device. In addition, the charging apparatus 110 may determine the charging state of the electronic device through the received response. The charging apparatus 110 may determine whether or not the detected electronic device is required to be charged, and may output the determination result through a display device, such as charging LEDs, in order for the user to recognize the charging state. For example, if the electronic device is in the fully charged state, the charging apparatus may emit a green light through the LED, and if the electronic device is not in the fully charged state, the charging apparatus may emit a red light through the same.

When the electronic device is detected at operation 812, the charging apparatus 110 may select the coil that corresponds to the charging method of the electronic device at operation 814. The charging apparatus 110 may select, or determine, the coil according to whether the detected electronic device is to be charged by the magnetic induction method or by the magnetic resonance method. For example, when a plurality of electronic devices is detected, the charging apparatus 110 may determine the charging method of each of the plurality of electronic devices, and may select the coil according to the determined charging method. Alternatively, when the electronic device is placed on the charging pad of the charging apparatus 110, the charging apparatus 110 may transmit a power beacon to the electronic device, and may receive a response to the transmitted signal in order to thereby determine the charging method of the electronic device. In addition, the charging apparatus 110 may select the coil corresponding to the portion where the electronic device is placed. For example, the charging apparatus 110 may transmit a power beacon to each induction coil, and may determine (select) the coil of which the amount of change in the impedance is minimal (e.g., the coil of which the wireless power transmission performance is highest) through the amount of change in the impedance of each induction coil. In addition, the charging apparatus 110 may wirelessly provide power to the electronic device through the determined coil. Alternatively, when a plurality of electronic devices is placed on the charging pad of the charging apparatus 110, the charging apparatus 110 may transmit a power beacon to each electronic device, and may receive a response to the transmitted signal from each electronic device in order to thereby determine the charging method of each electronic device. In addition, the charging apparatus 110 may determine the charging of each electronic device according to the charging method of each electronic device.

In the case where the charging apparatus 110 is to charge the electronic device by the magnetic induction method at operation 816, the charging apparatus 110 may transmit power through the induction coil in order to thereby charge the electronic device at operation 818. In the case where the charging apparatus 110 charges the electronic device by the magnetic induction method, the charging apparatus 110 may determine the induction coil corresponding to the position where the electronic device is placed (the coil of which the amount of change in the impedance is the minimum) in the power transmitting unit 111, and may charge the electronic device through the determined coil. The power transmitting unit 111 may include one or more induction coils. In addition, the plurality of induction coils may be provided in the positions where they do not interfere with each other in the resonance coil. The charging apparatus 110 may provide power to the electronic device through the selected coil. In addition, in the case where the charging is performed by the magnetic induction method, the charging apparatus 110 may periodically check the charging state of the electronic device, and if the charging is not completed, the charging apparatus 110 may return to operation 818 in order to thereby continue to charge the electronic device.

In the case where the charging apparatus 110 is to charge the electronic device by the magnetic resonance method at operation 816, the charging apparatus 110 may transmit power through the resonance coil in order to thereby charge the electronic device at operation 820. In the case where the charging apparatus 110 charges the electronic device by the magnetic resonance method, the charging apparatus 110 may charge the electronic device through the resonance coil configured in the charging pad of the power transmitting unit 111. The power transmitting unit 111 may include a resonance coil.

The charging apparatus 110 may periodically check the charging state of the electronic device to identify whether or not the charging is completed at operation 822. The charging apparatus 110 may determine the charging state of the detected electronic device, and may output the determination result through the charging LEDs in order for the user to recognize the charging state. For example, if the electronic device is in the fully charged state, the charging apparatus may emit a green light through the LED, and if the electronic device is not in the fully charged state, the charging apparatus may emit a red light through the same. For example, in the case where the charging is performed by the magnetic induction method, the charging apparatus 110 may periodically check the charging state of the electronic device, and if the charging is not completed, the charging apparatus 110 may return to operation 818 in order to thereby continue to charge the electronic device in the magnetic induction method. In addition, in the case where the charging is performed by the magnetic resonance method, the charging apparatus 110 may periodically check the charging state of the electronic device, and if the charging is not completed, the charging apparatus 110 may return to operation 820 in order to thereby continue to charge the electronic device by the magnetic resonance method.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to an embodiment, at least some of the devices (for example, modules or functions thereof) or the method (for example, operations) according to the present disclosure may be implemented by a command stored in a computer-readable storage medium in a programming module form. The instruction, when executed by a processor (e.g., the processor 112), may cause the one or more processors to execute the function corresponding to the instruction. The computer-readable storage medium may be, for example, the memory 115.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

According to an embodiment, a recording medium may store instructions that allow, when being executed by one or more processors, the one or more processors to perform the operations of: detecting one or more electronic devices; determining the charging method corresponding to the detected electronic device; and wirelessly providing power to the electronic device by selecting a coil corresponding to the determined charging method.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner.

Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling wireless charging by a charging apparatus, the method comprising:
   detecting an electronic device;
   transmitting, to the electronic device, a power signal for identifying a charging method of the detected electronic device;
   identifying the charging method of the electronic device according to whether a response signal is received via an in-band communication or an out-of-band communication from the electronic device based on the transmitted power signal;
   selecting a coil corresponding to the identified charging method from among a plurality of coils comprising a plurality of induction coils and a resonance coil; and
   wirelessly transmitting power to the electronic device through the selected coil, wherein selecting the coil further comprises:
      based on the response signal being received via the in-band communication, transmitting a first power beacon via each of the plurality of induction coils that are provided in the charging apparatus;
      measuring an impedance variation of each of the plurality of induction coils based on the transmitted first power beacon; and
      selecting, from among the plurality of induction coils, an induction coil of which a measured impedance variation is minimal, for wirelessly transmitting power to the electronic device.

2. The method according to claim 1, wherein the transmitting of the power signal comprises transmitting a second power beacon through a coil for induction detection and a third power beacon through a coil for resonance detection.

3. The method according to claim 2, wherein the power signal includes a fourth power beacon for induction detection of a greater power strength than the transmitted second power beacon for induction detection, and a fifth power beacon for resonance detection of a greater power strength than the transmitted third power beacon for resonance detection through each corresponding coil.

4. The method according to claim 1, wherein the identifying of the charging method comprises:
   when the response signal is received through the in-band communication from the electronic device, identifying that the electronic device is to be charged by a magnetic induction method; and
   when the response signal is received through the out-of-band communication from the electronic device, identifying that the electronic device is to be charged by a magnetic resonance method.

5. The method according to claim 1, further comprising:
   detecting another electronic device while the electronic device is wirelessly charged,
   identifying a charging method corresponding to the other electronic device, and
   wirelessly providing power to the other electronic device through a coil corresponding to the identified charging method of the other electronic device.

6. The method according to claim 1, further comprising:
   if a plurality of electronic devices are detected,
   identifying a charging method corresponding to each of the plurality of electronic devices, and
   wirelessly providing power to each of the detected plurality of electronic devices through a coil corresponding to the charging method identified for each of the detected plurality of electronic devices.

7. A charging apparatus for controlling wireless charging, the charging apparatus comprising:
   a power transmitter including a plurality of coils for wirelessly charging, wherein the plurality of coils comprise a plurality of induction coils and a resonance coil;
   a communication circuit and;
   at least one processor configured to:
      control to detect an electronic device,
      control to transmit, to the electronic device, a power signal for identifying a charging method of the detected electronic device, through the plurality of coils,
      identify the charging method of the electronic device according to whether a response signal is received via an in-band communication or an out-of-band communication from the electronic device based on the transmitted power signal,
      select a coil from among the plurality of coils corresponding to the identified charging method, and
      wirelessly transmit power to the electronic device through the selected coil,
   wherein the at least one processor is further configured to:
      based on the response signal being received via the in-band communication, transmit a first power beacon via each of the plurality of induction coils that are provided in the charging apparatus,
      measure an impedance variation of each of the plurality of induction coils based on the transmitted first power beacon, and
      select, from among the plurality of induction coils, an induction coil of which a measured impedance variation is minimal for wirelessly transmitting power to the electronic device.

8. The charging apparatus according to claim 7, further comprising a power amplifying circuit that includes a plurality of amplifiers for amplifying the power supplied to each of the plurality of coils.

9. The charging apparatus according to claim 7, wherein the at least one processor is further configured to:
   control a first driver to transmit a second power beacon through a coil for induction detection, and
   control a second driver to transmit a third power beacon through a coil for resonance detection.

10. The charging apparatus according to claim 9, wherein when the electronic device is detected, the at least one processor is further configured to control the first driver to transmit a fourth power beacon for induction detection of a greater power strength than the transmitted second power beacon for induction detection, and a fifth power beacon for resonance detection of a greater power strength than the transmitted third power beacon for resonance detection through each corresponding coil.

11. The charging apparatus according to claim 7, wherein when the response signal is received through the in-band communication from the electronic device, the at least one processor is further configured to identify that the electronic device is to be charged by a magnetic induction method, and wherein when the response signal is received through the out-of-band communication from the electronic device, the at least one processor is further configured to identify that the electronic device is to be charged by a magnetic resonance method.

12. The charging apparatus according to claim 7, wherein when another electronic device is detected while the electronic device is wirelessly charged, the at least one processor further configured to:
   identify a charging method corresponding to the other electronic device, and
   wirelessly provide power to the other electronic device through a coil corresponding to the identified charging method of the other electronic device.

13. The charging apparatus according to claim 7, wherein when a plurality of electronic devices is detected, the at least one processor is further configured to:
   identify a charging method for each of the detected plurality of electronic devices, and
   wirelessly provide power to each of the detected plurality of electronic devices through a coil corresponding to the charging method identified for each of the detected plurality of electronic devices.

* * * * *